US012761652B2

(12) United States Patent
Yamana et al.

(10) Patent No.: US 12,761,652 B2
(45) Date of Patent: Oct. 13, 2026

(54) AUTONOMOUS VEHICLE

(71) Applicant: Preferred Robotics, Inc., Tokyo (JP)

(72) Inventors: Takahiro Yamana, Tokyo (JP); Yoshito Ito, Tokyo (JP); Koji Terada, Tokyo (JP); Toru Isobe, Tokyo (JP)

(73) Assignee: Preferred Robotics, Inc., Tokyo (JP)

( * ) Notice: Subject to any disclaimer, the term of this patent is extended or adjusted under 35 U.S.C. 154(b) by 302 days.

(21) Appl. No.: 18/302,134

(22) Filed: Apr. 18, 2023

(65) Prior Publication Data

US 2023/0251668 A1 Aug. 10, 2023

Related U.S. Application Data

(63) Continuation of application No. PCT/JP2021/038422, filed on Oct. 18, 2021.

(30) Foreign Application Priority Data

Oct. 19, 2020 (JP) ................................ 2020-175628

(51) Int. Cl.
*G05D 1/00* (2006.01)
*B60P 3/00* (2006.01)
(Continued)

(52) U.S. Cl.
CPC .............. *G05D 1/0225* (2013.01); *B60P 3/00* (2013.01); *B60R 11/02* (2013.01); *G05D 1/0088* (2013.01); *G05D 1/0246* (2013.01); *G06F 3/16* (2013.01)

(58) Field of Classification Search
CPC .. G05D 1/0225; G05D 1/0088; G05D 1/0246; G06F 3/16; B60P 3/00; B60R 11/02
See application file for complete search history.

(56) References Cited

U.S. PATENT DOCUMENTS

2001/0035490 A1* 11/2001 Mishima ................ H04N 23/55
348/E5.027
2015/0321606 A1* 11/2015 Vartanian ........... G02B 27/0179
348/148
(Continued)

FOREIGN PATENT DOCUMENTS

CN 110892233 * 3/2020 ............. G06T 17/05
CN 110954889 * 4/2020 ........... G01S 15/931
(Continued)

OTHER PUBLICATIONS

H. Jula, C. I. Liu, E. B. Kosmatopoulos and P. A. loannou, "Optimum No. of automated shuttles driven by linear motors in an container terminal," 2001 European Control Conference (ECC), Porto, Portugal, 2001, pp. 289-294. (Year: 2001).*
(Continued)

*Primary Examiner* — Joan T Goodbody
(74) *Attorney, Agent, or Firm* — IPUSA, PLLC

(57) ABSTRACT

An autonomous vehicle with a reduced risk of collision during conveyance is provided. The autonomous vehicle docks with a conveyance target and conveys the conveyance target. The autonomous vehicle includes a docking mechanism configured to dock with the conveyance target, a sensor configured to acquire object position data related to a position of an object within a measurement range, and a controller configured to control, based on the object position data acquired from the sensor, the conveyance performed by the autonomous vehicle docked with the conveyance target. The measurement range of the sensor includes at least an area above the autonomous vehicle.

29 Claims, 14 Drawing Sheets

(51) Int. Cl.

| | |
|---|---|
| ***B60R 11/02*** | (2006.01) |
| ***G06F 3/16*** | (2006.01) |

(56) References Cited

U.S. PATENT DOCUMENTS

| | | | | |
|---|---|---|---|---|
| 2015/0362921 | A1* | 12/2015 | Hanaoka | G05D 1/0248 702/159 |
| 2016/0176487 | A1* | 6/2016 | Stone | B63G 8/001 114/179 |
| 2018/0288609 | A1 | 10/2018 | Yamaya et al. | |
| 2019/0202388 | A1* | 7/2019 | Sonoura | B60R 19/023 |
| 2019/0278281 | A1 | 9/2019 | Sakai | |
| 2020/0172139 | A1 | 6/2020 | Bakker et al. | |
| 2020/0223468 | A1 | 7/2020 | Azumi | |
| 2020/0321000 | A1 | 10/2020 | Kurihara et al. | |
| 2021/0292088 | A1 | 9/2021 | Tanaka et al. | |

FOREIGN PATENT DOCUMENTS

| | | | | |
|---|---|---|---|---|
| JP | H08-221122 | | 8/1996 | |
| JP | 2000-099147 | | 4/2000 | |
| JP | 2002-087539 | | 3/2002 | |
| JP | 2003-345435 | | 12/2003 | |
| JP | 2004-243504 | | 9/2004 | |
| JP | 3724030 | | 12/2005 | |
| JP | 2007-152446 | | 6/2007 | |
| JP | 2008-264901 | | 11/2008 | |
| JP | 2016-120561 | | 7/2016 | |
| JP | 2016150692 | * | 10/2016 | B61G 1/32 |
| JP | 2018-043832 | | 3/2018 | |
| JP | 2018039349 | * | 3/2018 | B62B 3/00 |
| JP | 2018-173830 | | 11/2018 | |
| JP | 2019032720 | * | 2/2019 | G07C 5/00 |
| JP | 2019-119343 | | 7/2019 | |
| JP | 2019-148881 | | 9/2019 | |
| JP | 2020-091571 | | 6/2020 | |
| JP | 2020-111161 | | 7/2020 | |
| JP | 2020-147214 | | 9/2020 | |
| JP | 2021-149410 | | 9/2021 | |
| KR | 10-2018-0038871 | | 4/2018 | |
| TW | I698213 | * | 7/2020 | A47L 9/122 |

OTHER PUBLICATIONS

Y. J. Lee, D. S. Han and K. S. Lee, “Advanced container transportation equipment using transfer robot and alignment system,” 2011 IEEE Symposium on Industrial Electronics and Applications, Langkawi, Malaysia, 2011, pp. 399-404. (Year: 2011).*

CN-110892233-A English translation (Year: 2020).*

CN-110954889-A English translation (Year: 2020).*

JP-2018039349-A English translation (Year: 2018).*

JP_2019032720 translation (Year: 2019).*

TW_I698213 translation (Year: 2020).*

U.S. Appl. No. 18/302,115, filed Apr. 18, 2023, Preferred Robotics, Inc.

Caixia He et al., “Deep Learning based Mobile Robot Target Object Localization and Pose Estimation Research”, IJACSA International Journal of Advanced Computer Science and Applications, vol. 14, No. 6, 2023 (Year 2023).

Chen Yang et al., “Target Position and Posture recognition based on RGB-D images for Autonomous Grasping Robot Arm Manipulation”, 10th International Conference on Information Science and Technology, Bath, United kingdom, Sep. 9-15, 2020, pp. 65-70 (Year: 2020).

Offic Action mailed Mar. 24, 2025 with respect to the related U.S. Appl. No. 18/302,115.

Action mailed on Aug. 15, 2025 with respect to the related U.S. Appl. No. 18/302,115.

Office Action mailed on Nov. 28, 2025 with respect to the related U.S. Appl. No. 18/302,115.

* cited by examiner

FIG.9

900

| SHELVING UNIT INFORMATION | | | | ITEM | TAG |
|---|---|---|---|---|---|
| ID | INITIAL POSITION | UNDOCKING POSITION | DOCKING POSITION | | |
| A | (x1,y1) | (x1',y1') | (w1,v1) | LAPTOP | WORK TOOLS |
| | | | | STATIONERY | WORK TOOLS |
| | | | | BOOKS | HOBBY |
| B | (x2,y2) | (x2",y2") | (x2',y2') | CONDIMENTS | DINING ITEMS |
| | | | | CUTLERY | DINING ITEMS |
| | | | | SNACKS | |
| | | | | | |

AUTONOMOUS VEHICLE

CROSS-REFERENCE TO RELATED APPLICATIONS

This application is a continuation application of International Application No. PCT/JP2021/038422 filed on Oct. 18, 2021, and designating the U.S., which is based upon and claims priority to Japanese Patent Application No. 2020-175628, filed on Oct. 19, 2020. The entire contents of these applications are incorporated herein by reference.

BACKGROUND

1. Technical Field

The disclosure herein relates to autonomous vehicles.

2. Description of the Related Art

An autonomous vehicle such as an automated guided vehicle (AGV) is generally used for industrial purposes, and performs conveyance by, for example, tugging a conveyance target (a cart or the like) that carries items.

Reducing the size of the autonomous vehicle to allow its use in a general household enables the autonomous vehicle to move in a limited space such as living room. However, when a small-sized autonomous vehicle tries to convey a conveyance target that larger than itself in a limited space, the possibility of a collision between the conveyance target and an obstacle increases.

This disclosure aims to provide an autonomous vehicle with reduced risk of collision during conveyance.

SUMMARY

An autonomous vehicle according to one aspect of the disclosure may include, for example, the following configuration. That is, the autonomous vehicle docks with a conveyance target and conveys the conveyance target. The autonomous vehicle includes a docking mechanism configured to dock with the conveyance target, a sensor configured to acquire object position data related to a position of an object within a measurement range, and a controller configured to control, based on the object position data acquired from the sensor, the conveyance performed by the autonomous vehicle docked with the conveyance target. The measurement range of the sensor includes at least an area above the autonomous vehicle.

BRIEF DESCRIPTION OF THE DRAWINGS

FIG. 9 is a view illustrating an example of a conveyance target management table;

DETAILED DESCRIPTION

Figure 1:
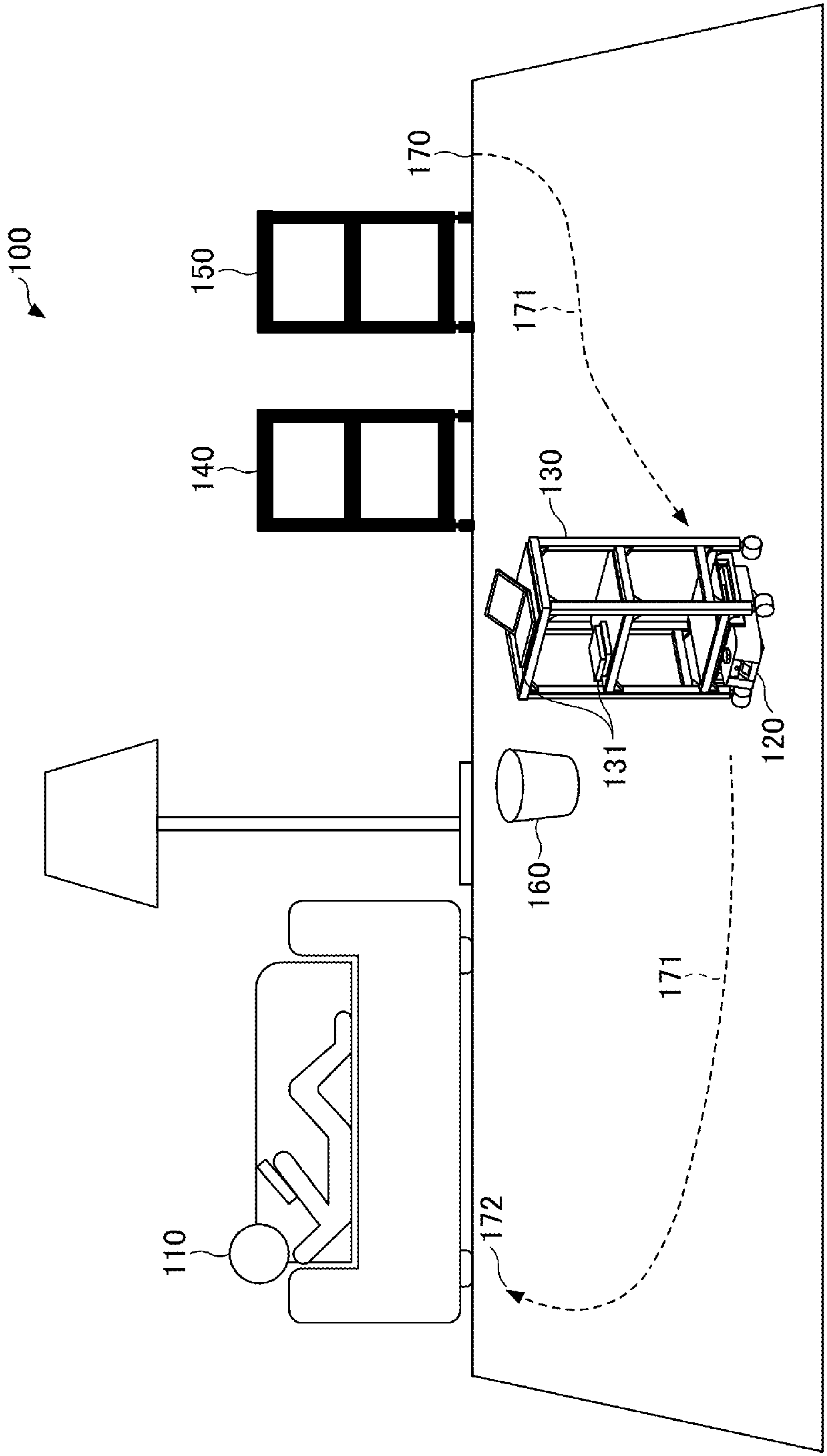
FIG. 1 is a view illustrating an example of a scenario in which an autonomous vehicle may be used.

Embodiments will be described hereinafter with reference to the accompanying drawings. Note that same reference numerals are used to denote components with substantially the same functional configuration throughout the specification and the drawings, and a repetitive description thereof will be omitted.

First Embodiment

Scenario for Use of Autonomous Vehicle

A scenario in which an autonomous vehicle according to the first embodiment may be used will be described. FIG. 1 is a view illustrating an example of a scenario in which the autonomous vehicle may be used. As illustrated in FIG. 1, an autonomous vehicle 120 may be used in, for example, a scenario where a user 110 is relaxing on a sofa in a predetermined space 100 such as a living room of a home.

The scenario in FIG. 1 illustrates a case where, for example, the user 110 has uttered a wake word and has subsequently uttered, "Bring me the laptop" to the autonomous vehicle 120 in order to use a laptop computer. In other words, FIG. 1 illustrates a case where a voice-based conveyance instruction (to be referred to as a voice instruction hereinafter) is performed. In this case, the autonomous vehicle 120 may identify, from among wheeled shelving units 130 to 150, the shelving unit 130 that is carrying work tools 131 such as a laptop computer, books, and the like, and may convey the shelving unit 130 to a position near the user 110 upon docking with the shelving unit 130. Note that the autonomous vehicle 120 may be configured to follow a voice instruction that is given without a wake word.

Using the autonomous vehicle 120 in this manner allows the user 110 to simply give a voice instruction to bring a laptop computer that is in a remote location to be within grasping distance of the user. Thus, the user is able to obtain the laptop computer without having to move from the sofa.

Note that the example of FIG. 1 illustrates a case where the shelving unit 130 is standing by at the position of an anchor 170 in the predetermined space 100 at the point when the user 110 gave the voice instruction. Furthermore, the example of FIG. 1 illustrates a case where a trash can 160 is present as an obstacle on the shortest conveyance path used when the shelving unit 130, which is standing by at the position of the anchor 170, is conveyed to a position 172 near the user 110.

In such a case, the autonomous vehicle 120 may detect the trash can 160 during conveyance of the shelving unit 130, and may convey the shelving unit 130 along a conveyance path that is indicated by a dotted arrow 171 to avoid collision with the trash can 160.

Further, although not illustrated in FIG. 1, assume a case where, for example, after the autonomous vehicle 120 has conveyed the shelving unit 130 to the position 172 near the user 110 and the user 110 has taken the laptop computer out from the shelving unit 130, the user 110 gives a voice instruction to the autonomous vehicle 120 by uttering, "Return the shelving unit back to its original place." In this case, the autonomous vehicle 120 may convey the shelving unit 130 to the position of the anchor 170.

Further, although the example of FIG. 1 illustrated a case where the autonomous vehicle 120 conveys the shelving unit 130 as the conveyance target, the autonomous vehicle 120 may identify and convey the shelving unit 140 or the shelving unit 150 depending on the contents of the voice instruction given by the user 110. Furthermore, the example of FIG. 1 illustrated a case where the autonomous vehicle 120 identified a position near the user 110 as the conveyance destination position of the shelving unit 130. However, depending on the contents of the voice instruction given by the user 110, a position near a predetermined object (for example, a piece of furniture) installed in the predetermined space 100 or a given position in the predetermined space 100 may be identified as the conveyance destination position of the shelving unit 130 by the autonomous vehicle 120.

External Configuration of Autonomous Vehicle

Figure 2A:
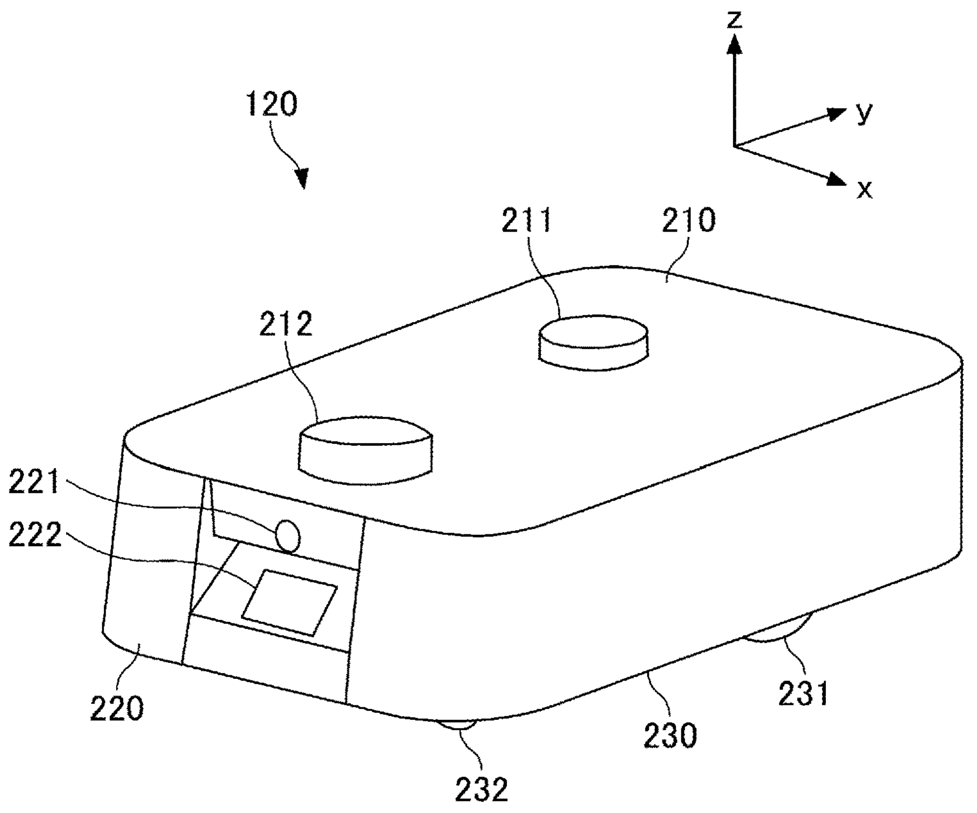
FIG. 2A is a view illustrating an example of the external configuration of the autonomous vehicle.
Figure 2B:
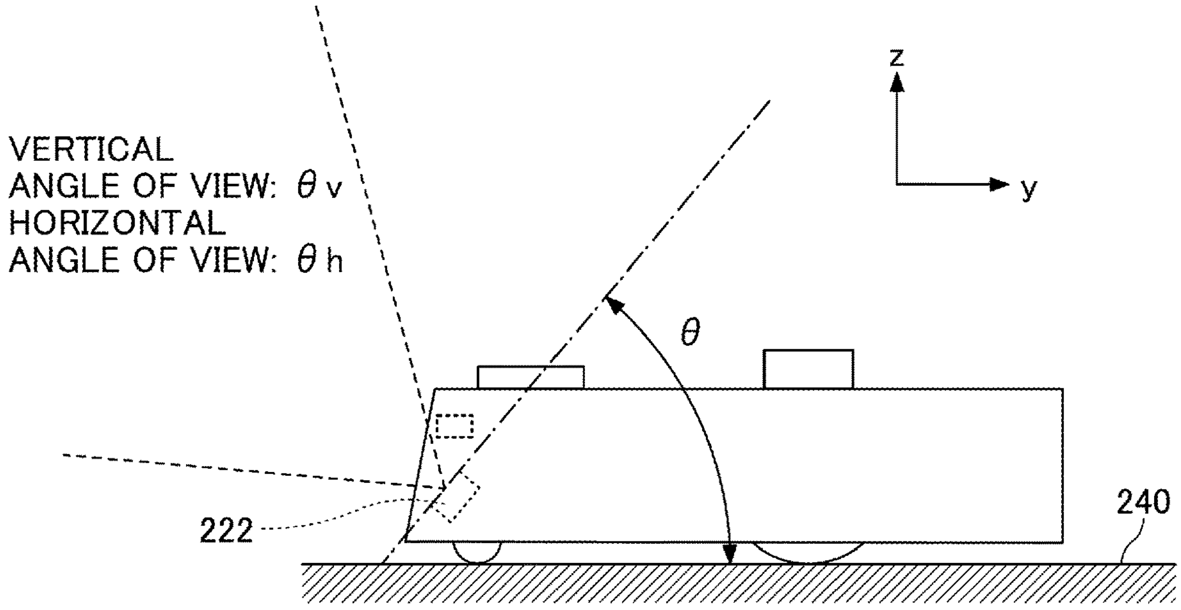
FIG. 2B is a view illustrating another example of the external configuration of the autonomous vehicle.

The external configuration of the autonomous vehicle 120 will be described next. FIGS. 2A and 2B are views each illustrating an example of the external configuration of the autonomous vehicle.

As illustrated in FIG. 2A, the autonomous vehicle 120 may have a rectangular cuboid shape as a whole, and its dimensions in a height direction (z-axis direction) and a widthwise direction (x-axis direction) may be defined so as to allow the autonomous vehicle 120 to enter below the bottom shelf (the bottom) of a conveyance-target shelving unit. Note that the shape of the autonomous vehicle 120 is not limited to a rectangular cuboid.

A lock pin 211, which is a component of a docking mechanism used to dock with the conveyance-target shelving unit, may be installed on a top part 210 of the autonomous vehicle 120. A laser imaging detection and ranging (LIDAR) device 212 may also be installed on the top part 210 of the autonomous vehicle 120. The measurement range of the LIDAR device 212 may cover the front-rear direction (y-axis direction) and the width direction (x-axis direction) at the higher position of the top part 210 of the autonomous vehicle 120. An obstacle or the like that is present in the measurement range can be detected by using the measurement result of the LIDAR device 212.

A front RGB camera 221 and a time-of-flight camera (ToF camera) 222 may be installed at a front part 220 of the autonomous vehicle 120. Note that although the front RGB camera 221 may be installed on the upper side with respect to the ToF camera 222, the installation position of the front RGB camera 221 is not limited to this position.

When the autonomous vehicle 120 moves in the forward direction, the front RGB camera 221 may capture and output color images of, for example, a shelving unit (for example, the shelving unit 130) that is to be the conveyance target, a user (for example, the user 110) who is near the conveyance destination, an installed object that is near the conveyance destination, an obstacle (for example, the trash can 160) on the conveyance path, and the like.

The ToF camera 222 is an example of a sensor that acquires measurement data (object position data) related to the three-dimensional position of an object within a measurement range. To avoid multipath interference, the ToF camera 222 may be installed facing upward on the front part 220 of the autonomous vehicle 120 to an extent that the surface (a floor 240 illustrated in FIG. 2B) on which the autonomous vehicle 120 travels is not included in the measurement range. An example of multipath interference may be a state where light emitted from a light source is reflected by another target object via the floor 240 and a reduction in measurement accuracy is caused due to the ToF camera 222 receiving the reflected light. In the embodiment, an upward installation angle θ of the ToF camera 222 on the front part 220 of the autonomous vehicle 120 may be approximately 50 degrees with respect to the floor 240.

Further, when the autonomous vehicle 120 moves in the forward direction, the ToF camera 222 may capture and output a range image (depth image) of an obstacle or the like by setting at least an area to be passed by the docked shelving unit (that is, an area corresponding to the height of the docked shelving unit×the width of the docked shelving unit) as the measurement range. The ToF camera 222 may output the captured range image (depth image) as three-dimensional positional data (object position data). Note that in the embodiment, the ToF camera 222 may have a vertical angle of view θv of 70 degrees and a horizontal angle of view θh of 90 degrees. A stereo camera or a monocular camera may be used instead of the ToF camera 222 as a sensor device to acquire the three-dimensional positional data of an object. In the case of a stereo camera, the three-dimensional positional data within the measurement range can be calculated from two images captured at the same timing. In the case of a monocular camera, the three-dimensional positional data within the measurement range can be calculated from two images captured at different timings, the direction of movement of the autonomous vehicle 120, and the distance moved by the autonomous vehicle 120.

Drive wheels 231 and non-drive wheels 232 are installed on a bottom part 230 of the autonomous vehicle 120 to support the autonomous vehicle 120.

The drive wheel 231 may be provided on each side in the width direction (x-axis direction) (that is, a total of two drive wheels may be provided along the width direction). Each drive wheel 231 may be independently motor-driven to move the autonomous vehicle 120 in the forward-backward direction (y-axis direction). The drive wheels 231 may also cause the autonomous vehicle 120 to turn about the z-axis.

The non-drive wheel 232 may be provided on each side in the width direction (x-axis direction) (that is, a total of two non-drive wheels may be provided along the width direction). Each of the non-drive wheels 232 may also be provided to be able to turn about the z-axis with respect to the autonomous vehicle 120. Note that the installation positions and number of non-drive wheels 232 may be other than those described above.

Figure 3A:
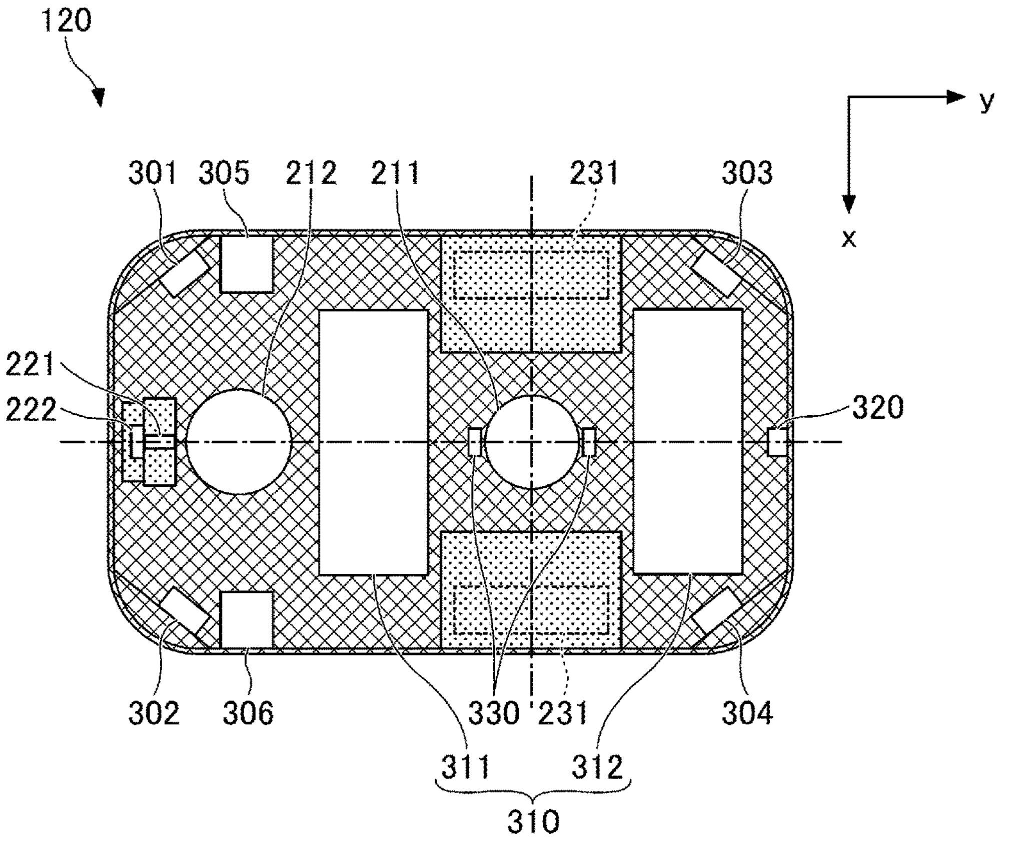
FIG. 3A is a view illustrating an of the internal configuration of the autonomous vehicle.
Figure 3B:
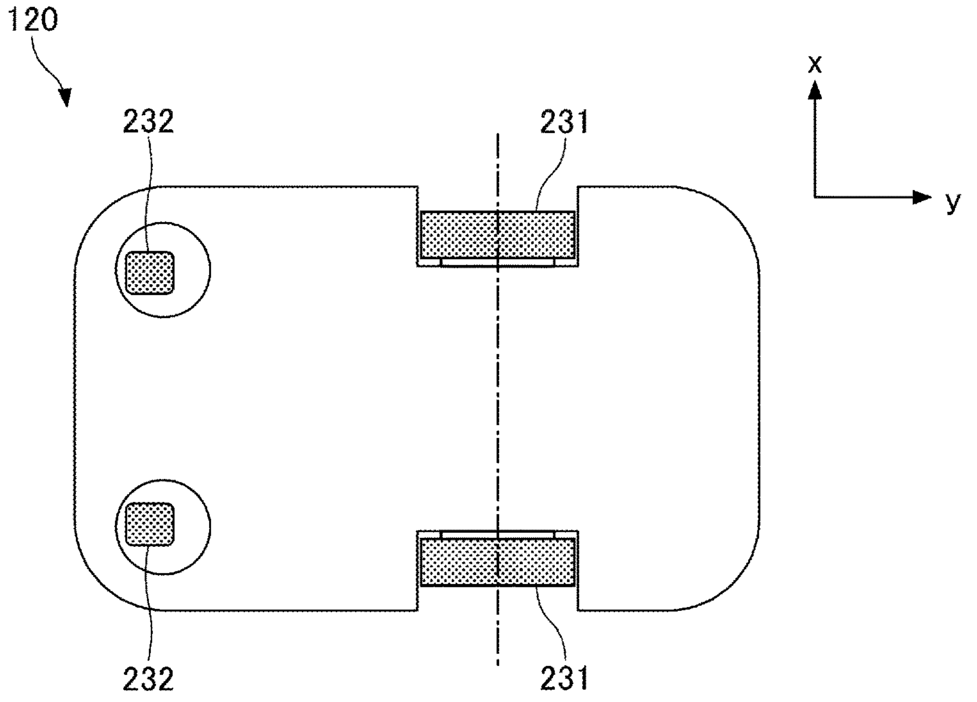
FIG. 3B is a view illustrating an example of the bottom configuration of the autonomous vehicle.

Details of Internal Configuration and Bottom Configuration of Autonomous Vehicle Details of the internal configuration and the bottom configuration of the autonomous vehicle will be described next. FIGS. 3A and 3B are views illustrating the internal configuration and the bottom configuration, respectively, of the autonomous vehicle.

FIG. 3A illustrates a state in which the autonomous vehicle 120 is seen from directly above without the top cover. Each of the components included in the internal configuration of the autonomous vehicle 120 will be described hereinafter with reference to FIG. 3A.

(a-1) First Control Circuit Board and Second Control Circuit Board

The first control circuit board and the second control circuit board will be described first. As illustrated in FIG. 3A, the autonomous vehicle 120 may include a first control circuit board 311 and a second control circuit board 312. In the embodiment, the first control circuit board 311 may control, for example, electronic devices, and the second control circuit board 312 may control, for example, drive devices. Note that, however, the division of the roles of the first control circuit board 311 and the second control circuit board 312 is not limited to this.

Note that the example of FIG. 3A illustrates a case where the first control circuit board 311 and the second control circuit board 312 are provided separately. However, the first control circuit board 311 and the second control circuit board 312 may also be provided integrally as a single circuit board. Regardless of whether the first control circuit board 311 and the second control circuit board 312 are installed separately or integrally, a device having both the functions of the first control circuit board 311 and the functions of the second control circuit board 312 is referred to as a control device (controller) 310 in the embodiment.

(a-2) Docking Mechanism

The docking mechanism will be described next. As illustrated in FIG. 3A, the autonomous vehicle 120 may include the solenoid lock pin 211 and photoreflectors 330 as a docking mechanism for docking with a shelving unit that is to be the conveyance target. Note that although the docking mechanism according to the embodiment may use a solenoid lock pin, the raising and lowering of the lock pin may be performed by an electromagnetic actuator other than a solenoid or another type of actuator such as rack and pinion mechanism, a trapezoidal thread mechanism, or a pneumatic drive mechanism.

In the embodiment, the drive wheels are provided such that one drive wheel is on each side in the width direction (x-axis direction), and the solenoid lock pin 211 may be provided at the center position of the drive wheels 231 in the width direction (x-axis direction), so as to be on the rotational axis of the drive wheels 231 (see the alternate long and short dashed lines in FIGS. 3A and 3B).

The solenoid lock pin 211 may include a compression coil spring. When the solenoid is turned on, the lock pin 211 is attracted, causing the compression coil to contract. When the solenoid is turned off, the solenoid lock pin 211 projects upward (in the z-axis direction, that is, toward the front side of drawing in the case of FIG. 3A) by the compression force of compression spring. Note that the control device 310 may control the solenoid to turn on and off.

The photoreflectors 330 may output signals to determine whether the lock pin 211 can be projected through a hole (to be described in detail later) of a lock guide attached to a conveyance-target shelving unit when the autonomous vehicle 120 enters below the bottom of the conveyance-target shelving unit.

The autonomous vehicle 120 may turn off the solenoid when it is determined, based on the signal output from the photoreflectors 330, that the lock pin 211 can be projected. Note that although photoreflectors may be used to detect the state in which the lock pin 211 is facing the hole of the lock guide in this embodiment, the detection may be performed by a method using a component other than the photoreflectors. A method using a component other than the photoreflectors may be, for example, a method using a camera, a physical switch, a magnetic sensor, an ultrasonic sensor, or the like.

Consequently, the lock pin 211 can project toward the hole of the lock guide, and the projected lock pin 211 can be inserted into the hole of the lock guide. As a result, the docking of the autonomous vehicle 120 with the conveyance-target shelving unit can be completed.

Note that, as described above, the drive wheels are provided such that one drive wheel is on each side in the width direction (x-axis direction), and the solenoid lock pin 211 may be provided at the center position of the drive wheels 231 in the width direction (x-axis direction). In other words, the lock pin 211 may be provided symmetrically in the width direction. Hence, when entering below the bottom shelf of the conveyance-target shelving unit, the autonomous vehicle 120 can enter in a forward direction or in a backward direction.

When the solenoid is turned on to attract the lock pin 211 in a state where the autonomous vehicle 120 is docked with the conveyance-target shelving unit, the autonomous vehicle 120 can be undocked from the conveyance-target shelving unit.

(a-3) Various Input and Output Devices

The various input and output devices will be described next. As illustrated in FIG. 3A, in addition to the LIDAR device 212, the front RGB camera 221, and the ToF camera 222 that are described above, the autonomous vehicle 120 may include various types of input devices such as a rear RGB camera 320, microphones 301 to 304, and loudspeakers 305 and 306.

As the installation positions, the installation directions, the measurement ranges, the measurement targets, and the like of the LIDAR device 212, the front RGB camera 221, and the ToF camera 222 have already been described, a description thereof will be omitted here.

When the autonomous vehicle 120 moves in the backward direction, the rear RGB camera 320 may capture and output color images of, for example, the conveyance-target shelving unit (for example, the shelving unit 130), an obstacle in the periphery of the conveyance-target shelving unit, and the like.

The microphones 301 to 304 are examples of audio input devices. The microphones 301 to 304 may be provided at the four corners (two on the front side and two on the rear side) of the autonomous vehicle 120 to detect sound from the respective directions. By providing the microphones 301 to 304 at the four corners of the autonomous vehicle 120 in this manner, the direction in which the user 110 who gave the voice instruction is present can be determined with respect to the current position and orientation of the autonomous vehicle 120, thus allowing estimation of the position of the user 110.

The loudspeakers 305 and 306 are examples of audio output devices, and may provide voice outputs (audio outputs) in the lateral direction of the autonomous vehicle 120. The loudspeakers 305 and 306 may provide, for example, voice outputs to confirm the contents of a task recognized by the autonomous vehicle 120 in response to a voice instruction from the user 110.

FIG. 3B illustrates a state in which the autonomous vehicle 120 is seen from the bottom part. Each of the components included in the bottom part of the autonomous vehicle 120 will be described hereinafter with reference to FIG. 3B.

(b-1) Drive Wheels

The drive wheels 231 will be described first. As illustrated in FIG. 3B, the autonomous vehicle 120 may include the drive wheels 231 that are provided such that one drive wheel is present on each side in the width direction (x-axis direction). As described above, each drive wheel 231 may be independently motor-driven to move the autonomous vehicle 120 in the forward-backward direction (y-axis direction) and to cause the autonomous vehicle 120 to turn about the z-axis.

More specifically, the autonomous vehicle 120 can be moved in the forward direction by rotating both of the drive wheels 231 forward, and the autonomous vehicle 120 can be moved in the backward direction by reversing both of the drive wheels 231. Further, the autonomous vehicle 120 can turn by rotating one of the drive wheels 231 forward and the other.

Note that as described above, the rotational axis of one of the drive wheels 231 may be formed coaxially with the rotational axis of the other drive wheel 231, and the solenoid lock pin 211 may be provided at the center position between one drive wheel 231 and the other drive wheel 231. Hence, when one drive wheel 231 is rotated forward and the other drive wheel 231 is rotated in reverse, the autonomous vehicle 120 is able to turn about the solenoid lock pin 211.

(b-2) Non-Drive Wheels

The non-drive wheels 232 will be described next. As illustrated in FIG. 3B, the autonomous vehicle 120 may include the non-drive wheels 232 that are provided such that one non-drive wheel is on each side in the width direction (x-axis direction). As described above, each non-drive wheel 232 may be provided so as to be able to turn about the z-axis. Hence, for example, when the autonomous vehicle 120 is to make a turn after moving in the forward direction or the backward direction, the non-drive wheels 232 can be oriented to immediately follow in the direction of the turn. Furthermore, for example, when the autonomous vehicle 120 is to move in the forward direction or the backward direction after making a turn, the non-drive wheels 232 can be oriented to immediately follow in the forward or backward direction.

Outline of Docking

Figure 4B:
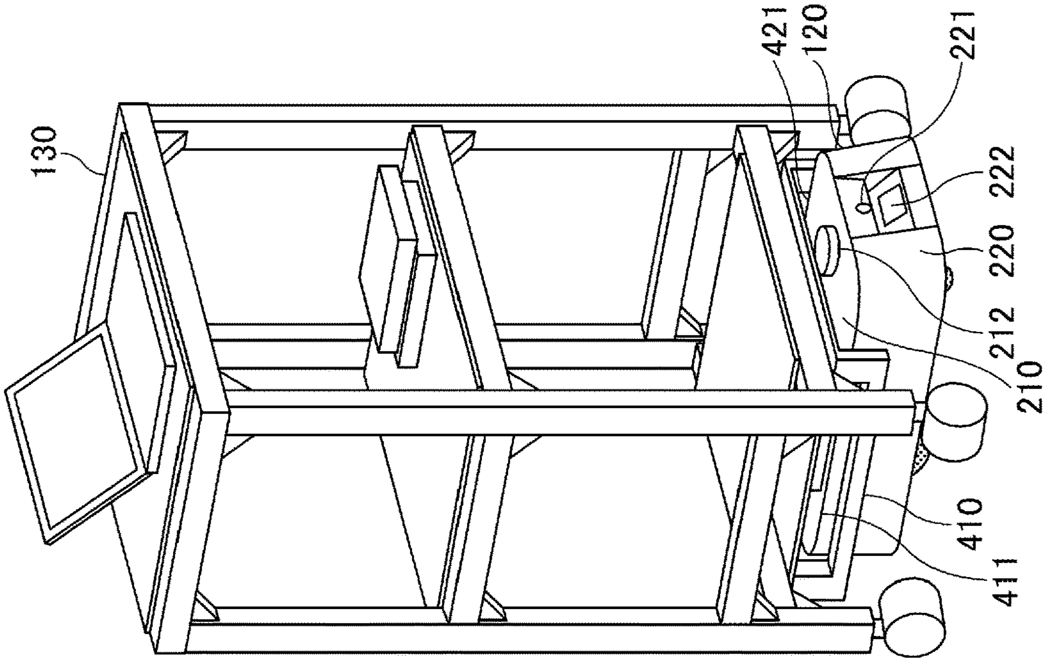
FIG. 4B is a view illustrating the state after the autonomous vehicle has docked with the shelving unit that is the conveyance target.
Figure 4A:
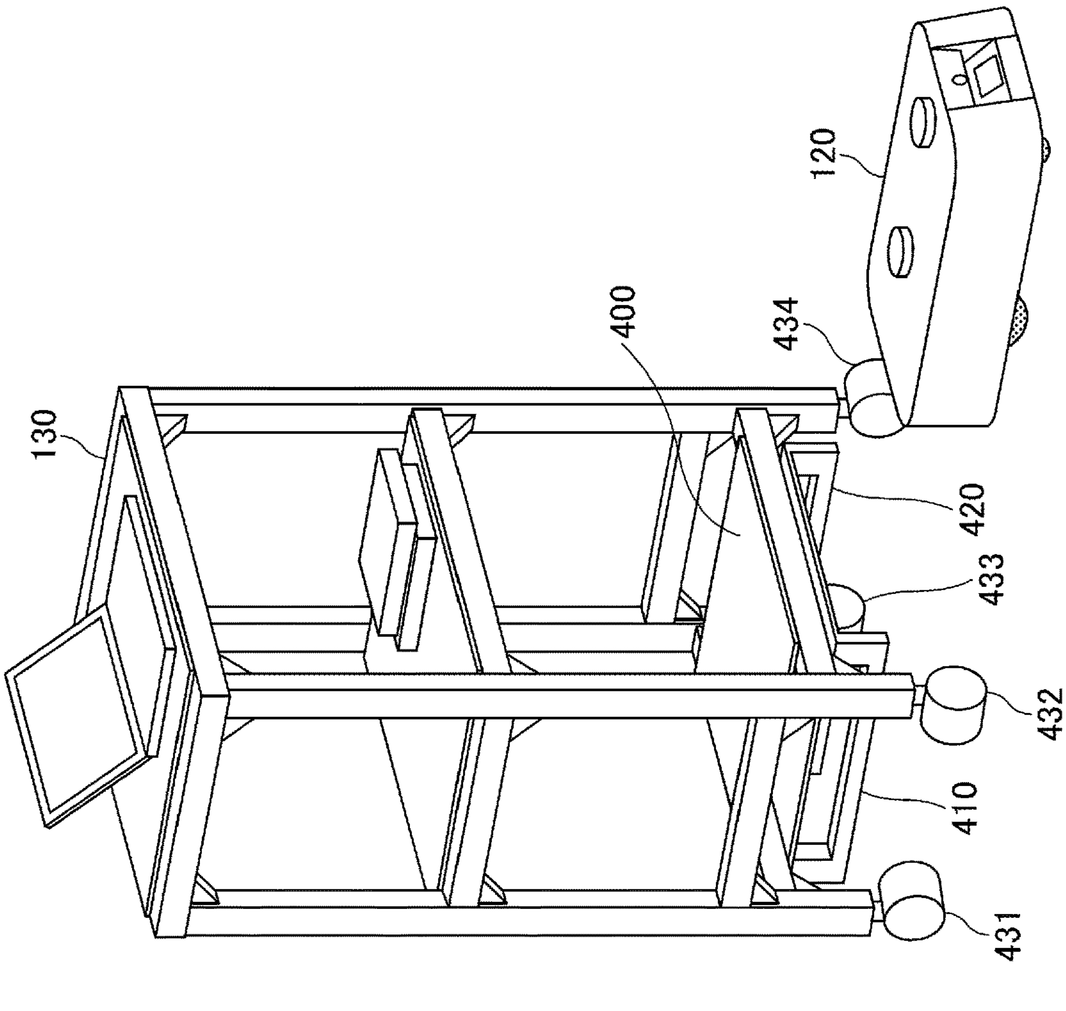
FIG. 4A is a view illustrating the state immediately before the autonomous vehicle docks with a shelving unit that is the conveyance target.

The outline of the docking operation will be described next. FIGS. 4A and 4B are views illustrating the state in which the autonomous vehicle docks with the conveyance-target shelving unit. FIG. 4A is a view illustrating a state immediately before the autonomous vehicle 120 docks with the conveyance-target shelving unit 130 that is standing by at the position of the anchor 170.

As illustrated in FIG. 4A, the shelving unit 130 may include three shelves. Frame guides 410 and 420 may be attached on the underside of a bottom shelf 400 so as to be substantially parallel to each other with a space corresponding to the width of the autonomous vehicle 120 provided therebetween. This configuration can define the entry direction when the autonomous vehicle 120 is to enter below the bottom shelf 400 of the conveyance-target shelving unit 130. Further, the frame guides 410 and 420 may function as guides in the width direction when the autonomous vehicle 120 is to convey the conveyance-target shelving unit 130, thereby preventing the shelving unit 130 from shifting in the width direction relative to the autonomous vehicle 120.

In addition, wheels 431 to 434 may be rotatably attached to the feet of the shelving unit 130. Such a configuration can allow the autonomous vehicle 120 to easily convey the docked shelving unit 130.

FIG. 4B illustrates a state after the autonomous vehicle 120 has docked with the conveyance-target shelving unit 130. As illustrated in FIG. 4B, even when the autonomous vehicle 120 is docked with the shelving unit 130, the front part 220 of the autonomous vehicle 120 is not obstructed by the shelves of the shelving unit 130. In other words, the front part 220 may project further in the forward direction relative to the shelves of the shelving unit 130. Hence, when the autonomous vehicle 120 is to convey the shelving unit 130, the measurement range of the front RGB camera 221 is not obstructed by any of the shelves of the shelving unit 130.

In a similar manner, when the autonomous vehicle 120 is to convey the shelving unit 130, the measurement range (the vertical angle of view θv and the horizontal angle of view θh) of the ToF camera 222 is not obstructed by any of the shelves of the shelving unit 130.

When the autonomous vehicle 120 is docked with the shelving unit 130, the front and rear measurement ranges of the LIDAR device 212 at the height position of the autonomous vehicle 120 are not obstructed. However, there is a possibility that the frame guides 410 and 420 may obstruct the measurement range of the LIDAR device 212 in the width direction.

Hence, the frame guides 410 and 420 of the shelving unit 130 can include openings 411 and 421, respectively, to reduce the extent to which the measurement ranges of the LIDAR device 212 in the width direction that may be obstructed. Therefore, when the autonomous vehicle 120 is to convey the shelving unit 130, the LIDAR device 212 can measure the measurement ranges in the front, rear, and width directions at the height position of the autonomous vehicle 120 without being obstructed by the shelving unit 130.

Note that although not illustrated in FIG. 4B, the microphones 301 and 302 (the microphones provided on the front side) may also be provided in a position that projects further in the forward direction relative to the shelves of the shelving unit 130 when the autonomous vehicle 120 is docked with the shelving unit 130. Hence, when the autonomous vehicle 120 is to convey the shelving unit 130, the detection ranges of the microphones 301 and 302 on the front side are not obstructed by any of the shelves of the shelving unit 130.

Figure 5A:
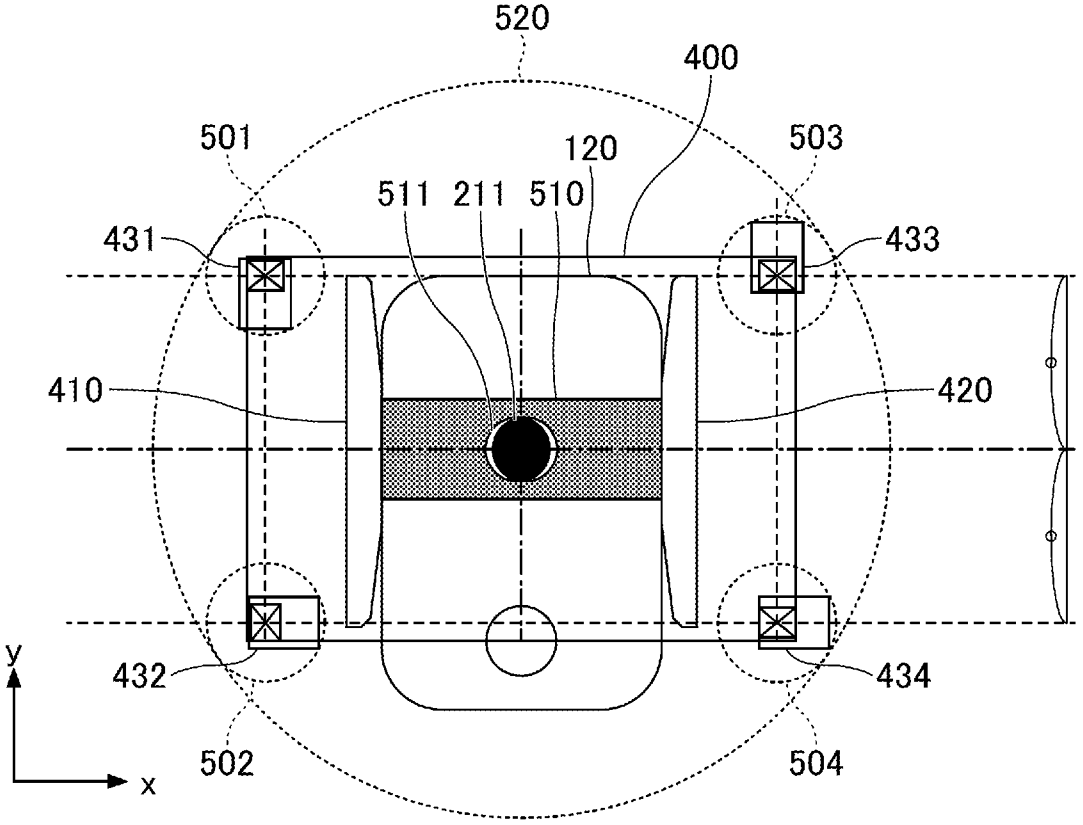
FIG. 5A is a view illustrating the positional relationship between the wheels of the shelving unit and the docking mechanism of the autonomous vehicle.
Figure 5B:
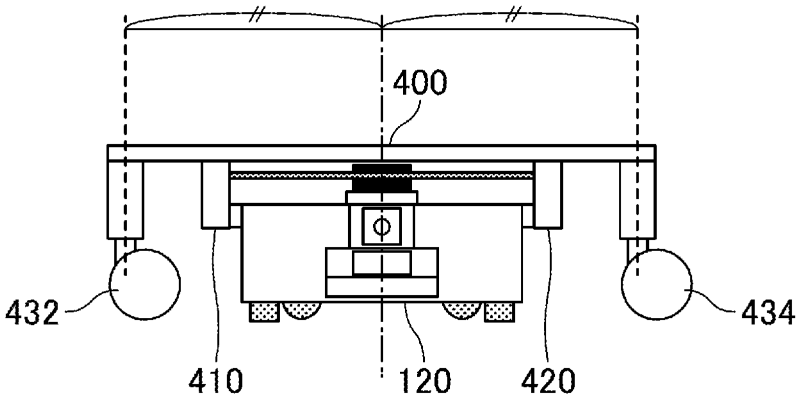
FIG. 5B is another view illustrating the positional relationship between the wheels of the shelving unit and the docking mechanism of the autonomous vehicle.

Relationship Between Positions of Wheels of Shelving Unit and Position of Docking Mechanism of Autonomous Vehicle The positional relationship between the wheels 431 to 434 that may be rotatably attached to the shelving unit 130 and the docking mechanism of the autonomous vehicle 120 will be described next. FIGS. 5A and 5B are views illustrating the positional relationship between the wheels of the shelving unit and the docking mechanism of the autonomous vehicle.

FIG. 5A illustrates a state where the autonomous vehicle 120 is docked with the shelving unit 130 as seen from directly above the bottom shelf 400 of the shelving unit 130. Note that, however, only the outer frame of the bottom shelf 400 is illustrated for the sake of descriptive convenience. Further, FIG. 5B illustrates a state where the autonomous vehicle 120 is docked with the shelving unit 130 as seen in the direction of the front part 220 of the autonomous vehicle 120.

As illustrated in FIG. 5A, the four wheels 431 to 434 of the shelving unit 130 may be rotatably attached at the corners of the bottom shelf 400. Reference numerals 501 to 504 indicate the rotation ranges of the four wheels 431 to 434, respectively. The respective center positions of the rotation ranges 501 to 504 are the respective centers of rotation of the wheels 431 to 434.

Further, as illustrated in FIG. 5A, a lock guide 510 may be attached on the lower side of the bottom shelf 400 of the shelving unit 130. The lock guide 510 may include a hole 511 in which the solenoid lock pin 211 is inserted when the solenoid lock pin 211 projects.

Note that the surface of the lock guide 510 may be, for example, white. Adopting such a color may allow easier determination when whether the lock pin 211 can be inserted into the hole 511 of the lock guide 510 is to be determined based on the signals output from the photoreflectors 330.

Inserting the lock pin 211 into the hole 511 of the lock guide 510 can prevent the shelving unit 130 from shifting in the forward direction or the backward direction relative to the autonomous vehicle 120 when the autonomous vehicle 120 is to convey the shelving unit 130. Note that in the drawing of the embodiment, the projected lock pin 211 is indicated in black to clearly illustrate whether the lock pin 211 is in a projected state.

The center position of the hole 511 of the lock guide 510 may be provided to match the center position with respect to each of the respective centers of rotation of the four wheels 431 to 434 of the shelving unit 130 (see the broken lines and the alternate long and short dash lines in FIGS. 5A and 5B). Hence, in a state where the autonomous vehicle 120 is docked with the shelving unit 130, the center position of the lock pin 211 can also be the center position with respect to the respective centers of rotation of the four wheels 431 to 434 of the shelving unit 130.

As described above, since the autonomous vehicle 120 may be provided to rotate about the lock pin 211 as the center, the shelving unit 130 may turn about the center position with respect to the respective centers of rotation of the four wheels 431 to 434 when the autonomous vehicle 120 turns. That is, the rotation range of the shelving unit 130 when the autonomous vehicle 120 turns can be the range indicated by reference numeral 520. In other words, the autonomous vehicle 120 can make the shelving unit 130 turn within a minimum rotation range.

Operation Example of Docking Mechanism

Figures 6A, 6B, 6C:
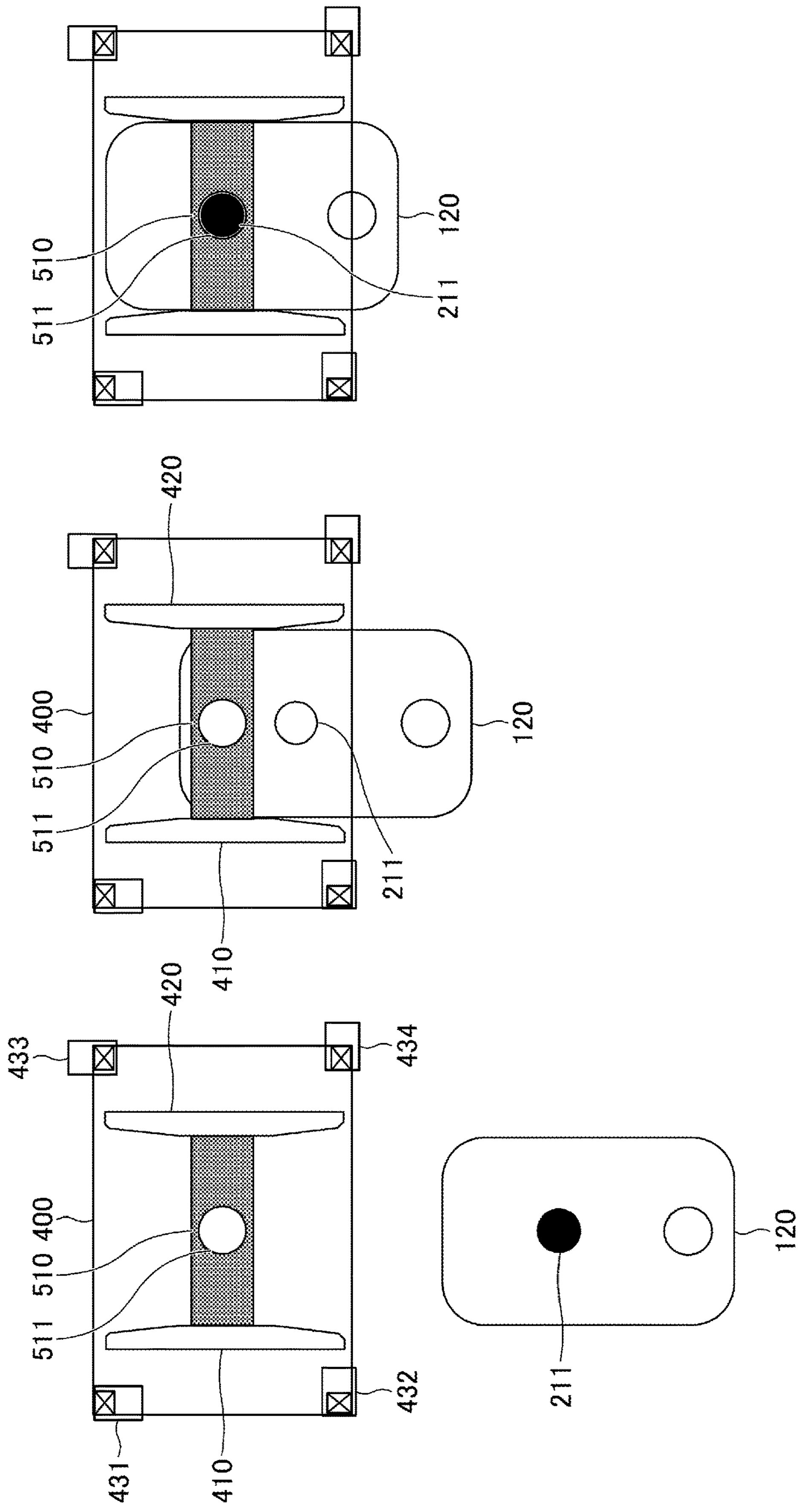
FIGS. 6A to 6C are views illustrating examples of the operation of the docking mechanism during docking.

An operation example of the docking mechanism when the autonomous vehicle 120 is to dock with the shelving unit 130 will be described. Here, an operation example when the autonomous vehicle 120 is to dock with the shelving unit 130 that is standing by in the position of the anchor 170 will be described. FIGS. 6A to 6C are views illustrating the examples of the operation of the docking mechanism at the time of docking. In a similar manner to FIG. 5A, FIGS. 6A to 6C each illustrate a state as seen from directly above the bottom shelf 400 of the shelving unit 130. Note that, however, only the outer frame of the bottom shelf 400 has been illustrated for the sake of descriptive convenience.

FIG. 6A illustrates a state where the autonomous vehicle 120 has moved to a position near the conveyance-target shelving unit 130 and has subsequently searched for the shelving unit 130 based on a color image captured by the front RGB camera 221. Note that any appropriate method may be used to search for the shelving unit 130. For example, the shelving unit 130 may be searched by, for example, performing pattern matching based on the shape features of the shelving unit 130 calculated in advance and the shape features of the shelving unit 130 extracted from the color image. Alternatively, for example, the shelving unit 130 may be searched by extracting, from the color image, a marker that is applied on the shelving unit 130 in advance to identify the shelving unit 130. Alternatively, for example, the shelving unit 130 may be searched by using a deep-learning-based object recognition model to perform instance segmentation on the color image.

Furthermore, FIG. 6A illustrates a state where the autonomous vehicle 120 has recognized the position and the orientation of the shelving unit 130 (the orientation of the frame guides 410 and 420) and has turned 180 degrees with respect to the entry direction at the time of docking when the autonomous vehicle 120 has found the shelving unit 130.

The autonomous vehicle 120 that has turned 180 degrees can start the docking operation based on the color image captured by the rear RGB camera 320.

More specifically, after the lock pin 211 is attracted by turning on the solenoid, the autonomous vehicle 120 can start moving in the backward direction and enter between the frame guide 410 and the frame guide 420 below the bottom shelf 400.

FIG. 6B illustrates a state where the autonomous vehicle 120 has entered between the frame guide 410 and the frame guide 420 by moving in the backward direction. During the entry, the autonomous vehicle 120 can monitor the measurement results of the photoreflectors 330 to determine whether the lock pin 211 can be inserted into the hole 511 of the lock guide 510.

FIG. 6C illustrates a state where the lock pin 211 can be inserted into the hole 511 of the lock guide 510. In the state illustrated in FIG. 6C, the autonomous vehicle 120 turns off the solenoid to cause the lock pin 211 to project and be inserted into the hole 511. As a result, the docking of the autonomous vehicle 120 to the shelving unit 130 is completed.

Hardware Configuration of Control Device

Figure 7:
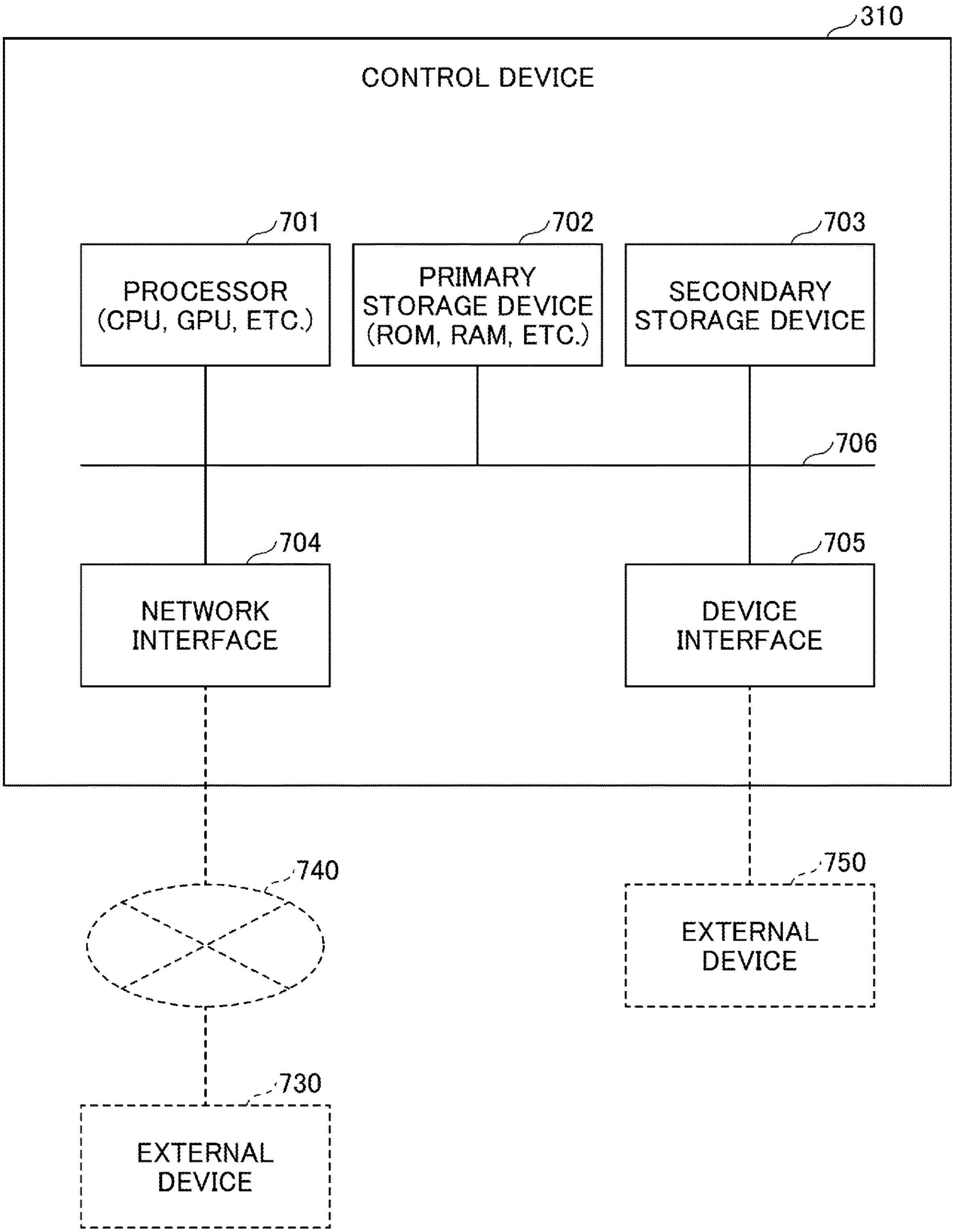
FIG. 7 is a block diagram illustrating an example of the hardware configuration of a control device.

The hardware configuration of the control device 310 will be described next. FIG. 7 is a block diagram illustrating the hardware configuration of the control device. The control device 310 may include, as components, a processor 701, a primary storage device (memory) 702, a secondary storage device 703, a network interface 704, and a device interface 705. The control device 310 may be implemented as a computer in which these components are connected to each other via a bus 706. Although the control device 310 is illustrated as including one of each component in FIG. 7, the control device 310 may include a plurality of the same components.

The various operations of the control device 310 may be executed by parallel processing using one or more processors. Further, the various operations may be distributed to a plurality of arithmetic cores in the processor 701 and executed by parallel processing. Furthermore, some or all of the processes, means, and the like of the present disclosure may be executed by an external device 730 (which may be at least one of a processor or a storage device) provided on the cloud capable of communicating with the control device 310 via the network interface 704. In this manner, the control device 310 may take the form of parallel computing by one or more computers.

The processor 701 may be an electronic circuit such as a processing circuit, processing circuitry, a CPU, a GPU, an FPGA, an ASCI, or the like. The processor 701 may also be a semiconductor device including a dedicated processing circuit. Note that the processor 701 is not limited to an electronic circuit using digital logic elements. The processor 701 may also be implemented by an optical circuit using optical elements. Furthermore, the processor 701 may be a processor that has a computation function based on quantum computing.

The processor 701 may perform various operations based on various data and commands input from the devices and the like of the internal configuration of the control device 310, and may output the operation results and control signals to the devices and the like. The processor 701 may execute an operating system (OS), an application, and the like to control the various components included in the control device 310.

The processor 701 may also refer to one or more electronic circuits arranged on a single chip or one or more electronic circuits arranged on two or more chips or devices. In a case where multiple electronic circuits are used, each electronic circuit may communicate through wired or wireless communication.

The primary storage device 702 may be a storage device that stores various types of data and commands to be executed by the processor 701. The processor 701 can read the various types of data stored in the primary storage device 702. The secondary storage device 703 may be a storage device other than the primary storage device 702. Note that each of these storage devices may be any electronic component capable of storing various types of data (for example, data stored in a conveyance target management table storage unit 801 or data stored in an environment map storage unit 802, both of which will be described later), and may be a semiconductor memory. A semiconductor memory may be either a volatile memory or a nonvolatile memory. Each storage device for storing various types of data in the control device 310 may be implemented by the primary storage device 702, the secondary storage device 703, or an internal memory built in the processor 701.

Moreover, a single processor 701 or multiple processors 701 may be connected (or coupled) with respect to the single primary storage device 702. Alternatively, multiple primary storage devices 702 may be connected (or coupled) with respect to one processor 701. In a case where the configuration of the control device 310 includes at least one primary storage device 702 and multiple processors 701 connected (or coupled) to the at least one primary storage device 702, a configuration in which at least one processor of the multiple processors 701 is connected (or coupled) to the at least one primary storage device 702 may be included. Further, this configuration may be implemented by the primary storage device 702 and the processor 701 included in multiple control devices 310. Furthermore, a configuration (for example, such as that of a cache memory including a L1 cache, a L2 cache, or the like) in which the primary storage device 702 is integral with a processor may be included.

The network interface 704 may be an interface for connecting to a communication network 740 by wired or wireless communication. The network interface 704 may use any suitable interface or the like that conforms to existing communication standards. The network interface 704 may enable various types of data to be exchanged with the external device 730 that is connected via the communication network 740. Note that the communication network 740 may be any one or a combination of a wide area network (WAN), a local area network (LAN), a personal area network (PAN), or the like, as long as the communication network 740 enables exchange of information between the computer and other devices such as the external device 730. Examples of the WAN may include the Internet or the like. Examples of the LAN include the IEEE 802.11, Ethernet (registered trademark), or the like. Examples of PAN may include the Bluetooth (registered trademark), near field communication (NFC), or the like.

The device interface 705 may be a USB or the like that directly connects with the external device 750.

The external device 750 is a device connected to a computer. The external device 750 may be, for example, an input device. In the embodiment, examples of the input device may include electronic devices such as cameras (the front RGB camera 221, the ToF camera 222, and the rear RGB camera 320), microphones (the microphones 301 to 304), and various sensors (the photoreflectors 330), and provides acquired information to the computer.

The external device 750 may be, for example, an output device. In the embodiment, the output device may be, for example, a liquid crystal display (LCD), a cathode ray tube (CRT), a plasma display panel (PDP), an organic electro luminescence (EL) panel, or the like. The output device may also be, for example, a loudspeaker (the loudspeakers 305 and 306) that performs voice outputs (audio outputs) or the like. Examples of the output device may also include driving devices such as various types of drivers (motors, solenoids, and the like).

The external device 750 may also be a storage device (memory). For example, the external device 750 may be a network storage. The external device 750 may also be a storage such as an HDD.

Furthermore, the external device 750 may be a device that has some of the functions of the components of the control device 310. That is, the computer may transmit or receive some or all of the processing results of the external device 750.

Functional Configuration of Control Device

Figure 8:
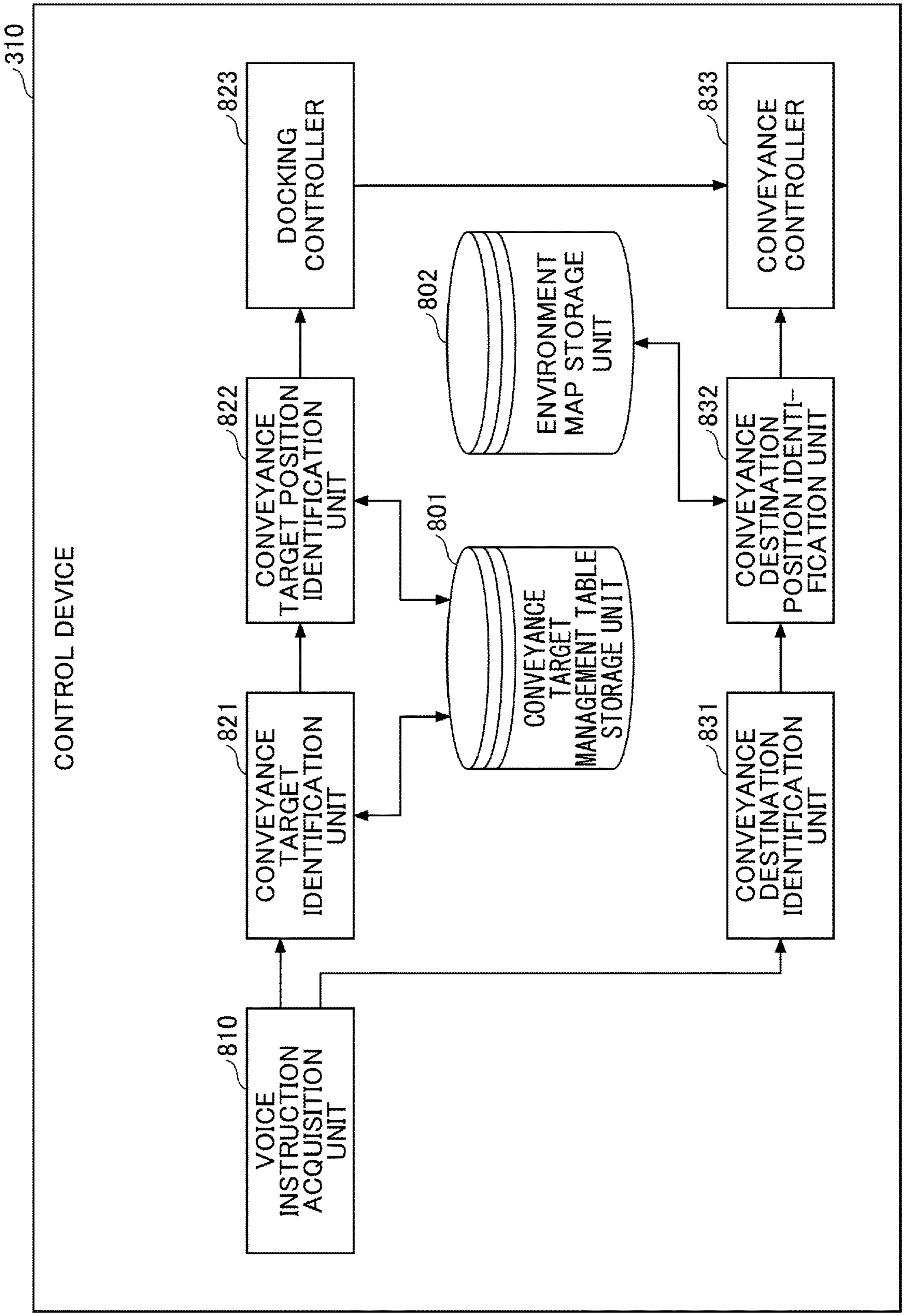
FIG. 8 is a block diagram illustrating an example of the functional configuration of the control device.

The functional configuration of the control device 310 will be described next. FIG. 8 is a block diagram illustrating an example of the functional configuration of the control device. A control program may be installed in the control device 310. Executing the control program may cause the control device 310 to function as a voice instruction acquisition unit 810, a conveyance target identification unit 821, a conveyance target position identification unit 822, and a docking controller 823. The control device 310 may also function as a conveyance destination identification unit 831, a conveyance destination position identification unit 832, and a conveyance controller 833. In the description of each unit of the control device 310, the conveyance to deliver an item to the user in accordance with the voice instruction, which is referred to as a delivery conveyance, and the conveyance to return the shelving unit after the delivery conveyance has been performed in accordance with the voice instruction, which is referred to as a return conveyance, will be described separately.

(1) Functions of Units during Delivery Conveyance

The respective functions of the units (the voice instruction acquisition unit 810 to the conveyance controller 833) during the delivery conveyance will be described. The voice instruction acquisition unit 810 may recognize a wake word uttered by the user 110 from the audio data detected by the microphones 301 to 304, and acquire the voice instruction following the wake word. Further, the voice instruction acquisition unit 810 may notify the conveyance target identification unit 821 and the conveyance destination identification unit 831 about the acquired voice instruction.

The conveyance target identification unit 821 may analyze the voice instruction received in the notification from the voice instruction acquisition unit 810, and may identify an item (for example, a laptop computer) that is to be conveyed by the autonomous vehicle 120. Further, the conveyance target identification unit 821 may refer to the conveyance target management table storage unit 801 to identify the shelving unit (for example, the shelving unit 130) that has the identified item as the conveyance target in the delivery conveyance. In addition, the conveyance target identification unit 821 may notify the conveyance target position identification unit 822 about the shelving unit that has been identified as the conveyance target.

Note that in a case where the acquired voice instruction includes a word indicating the conveyance-target shelving unit instead of the word indicating the item to be conveyed, the conveyance target identification unit 821 may directly identify the conveyance-target shelving unit (for example, the shelving unit 130) and notify the conveyance target position identification unit 822 about the conveyance-target shelving unit.

The conveyance target position identification unit 822 may refer to the conveyance target management table storage unit 801 to identify the current position of the conveyance-target shelving unit in the delivery conveyance notified from the conveyance target identification unit 821. Further, the conveyance target position identification unit 822 may notify the docking controller 823 about the coordinates (data) indicating the position of the identified conveyance-target shelving unit (for example, the coordinates indicating the position of the anchor 170).

The docking controller 823 may execute control to cause the autonomous vehicle 120 to move based on the coordinates indicating the position of the conveyance-target shelving unit of the delivery conveyance and the coordinates indicating the current position of the autonomous vehicle 120 that were notified from the conveyance target position identification unit 822. Further, the docking controller 823 may execute control to cause the autonomous vehicle 120 to dock with the conveyance-target shelving unit. When the autonomous vehicle 120 has completed docking with the conveyance-target shelving unit, the docking controller 823 may notify the conveyance controller 833 of the completion of the docking operation.

The conveyance destination identification unit 831 may analyze the voice instruction received in the notification from the voice instruction acquisition unit 810, and may identify the conveyance destination position (for example, a position near the user 110) of the conveyance-target shelving unit of the delivery conveyance. Further, the conveyance destination identification unit 831 notifies the conveyance destination position identification unit 832 of the identified conveyance destination position.

If the conveyance destination position notified from the conveyance destination identification unit 831 is a position near an installed object (for example, a piece of furniture) in the predetermined space 100, the conveyance destination position identification unit 832 may refer to the environment map storage unit 802 to identify the coordinates (data) indicating the conveyance destination. Note that the environment map storage unit 802 stores the coordinates of each installed object in the predetermined space 100.

Further, in a case where the conveyance destination notified from the conveyance destination identification unit 831 is a position near the user 110, the conveyance destination position identification unit 832 may identify the conveyance destination position based on the direction in which the user 110 is present, which is determined by determining the microphones 301 to 304 from which the audio data including the voice instruction is acquired from, as well as the position and orientation of the autonomous vehicle 120 at the time the voice instruction is acquired.

Note that the autonomous vehicle 120 may periodically calculate its own position and orientation in the predetermined space 100 based on at least one of a measurement result measured by the LIDAR device 212, a color image captured by the front RGB camera 221, or a range image captured by the ToF camera 222.

Furthermore, the conveyance destination position identification unit 832 may notify the conveyance controller 833 of the coordinates of the conveyance destination position that has been identified.

When the conveyance controller 833 is notified about the completion of the docking from the docking controller 823, the conveyance controller 833 may execute control to move the autonomous vehicle 120 based on the coordinates indicating the conveyance destination position notified from the conveyance destination position identification unit 832.

While the autonomous vehicle 120 is moving, the conveyance controller 833 may refer to the measurement result measured by the LIDAR device 212, the color image captured by the front RGB camera 221, the range image captured by the ToF camera 222, or any combination thereof. The conveyance controller 833 may calculate the current position of the autonomous vehicle 120. In a case where an obstacle is detected on the conveyance path, the conveyance controller 833 may execute control to avoid a collision.

After the autonomous vehicle 120 has arrived at the conveyance destination position, the conveyance controller 833 may cause the autonomous vehicle 120 to undock from the conveyance-target shelving unit of the delivery conveyance, and cause the autonomous vehicle 120 to exit from below the bottom shelf 400.

(2) Functions of Units During Return Conveyance

The respective functions of the units (the voice instruction acquisition unit 810 to the conveyance controller 833) during return conveyance will be described next. The voice instruction acquisition unit 810 may recognize the wake word uttered by the user 110 from the audio data detected by the microphones 301 to 304, and acquire the voice instruction following the wake word. Further, the voice instruction acquisition unit 810 may notify the conveyance target identification unit 821 and the conveyance destination identification unit 831 about the acquired voice instruction.

The conveyance target identification unit 821 may analyze the voice instruction received in the notification from the voice instruction acquisition unit 810, and may identify, as the conveyance target in the return conveyance, the shelving unit (for example, the shelving unit 130 after the delivery conveyance) that is to be conveyed to the original position by the autonomous vehicle 120. Further, the conveyance target identification unit 821 may notify the conveyance target position identification unit 822 about the identified conveyance target.

The conveyance target position identification unit 822 may refer to the conveyance target management table storage unit 801 to identify the current position of the conveyance-target shelving unit in the return conveyance notified from the conveyance target identification unit 821. Further, the conveyance target position identification unit 822 may notify the docking controller 823 about the coordinates indicating the position of the identified conveyance-target shelving unit (for example, the coordinates indicating the position near the user 110).

The docking controller 823 may execute control to cause the autonomous vehicle 120 to move based on the coordinates indicating the position of the conveyance-target shelving unit of the return conveyance and the coordinates indicating the current position of the autonomous vehicle 120 that were notified from the conveyance target position identification unit 822. Further, the docking controller 823 may execute control to cause the autonomous vehicle 120 to dock with the conveyance-target shelving unit. When the autonomous vehicle 120 has completed docking with the conveyance-target shelving unit, the docking controller 823 may notify the conveyance controller 833 of the completion of the docking operation.

The conveyance destination identification unit 831 may analyze the voice instruction received in the notification from the voice instruction acquisition unit 810, and may identify the conveyance destination position (for example, the position of the anchor 170) of the conveyance-target shelving unit of the return conveyance. Further, the conveyance destination identification unit 831 notifies the conveyance destination position identification unit 832 of the identified conveyance destination position.

If the conveyance destination position notified from the conveyance destination identification unit 831 is the position near the anchor (for example, the position of the anchor 170) in the predetermined space 100, the conveyance destination position identification unit 832 may refer to the environment map storage unit 802 to identify the coordinates indicating the conveyance destination.

Further, the conveyance destination position identification unit 832 notifies the conveyance controller 833 of the coordinates indicating the identified conveyance destination position.

When the conveyance controller 833 is notified about the completion of the docking from the docking controller 823, the conveyance controller 833 may execute control to move the autonomous vehicle 120 based on the coordinates indicating the conveyance destination position notified from the conveyance destination position identification unit 832.

While the autonomous vehicle 120 is moving, the conveyance controller 833 may refer to the measurement result measured by the LIDAR device 212, the color image captured by the front RGB camera 221, and/or the range image captured by the ToF camera 222. The conveyance controller 833 may calculate the current position of the autonomous vehicle 120. In a case where an obstacle is detected on the conveyance path, the conveyance controller 833 may execute control to avoid a collision.

After the autonomous vehicle 120 has arrived at the conveyance destination position, the conveyance controller 833 may cause the autonomous vehicle 120 to undock from the conveyance-target shelving unit of the return conveyance, and cause the autonomous vehicle 120 to exit from below the bottom shelf 400.

Specific Example of Conveyance Target Management Table

A specific example of the conveyance target management table stored in the conveyance target management table storage unit 801 will be described next. FIG. 9 is a view illustrating an example of the conveyance target management table.

As illustrated in FIG. 9, the conveyance target management table may be a table in which conveyance-target shelving units are associated with respective items carried by the shelving units. A conveyance target management table 900 may include "SHELVING UNIT INFORMATION", "ITEM", and "TAG" as information items.

"SHELVING UNIT INFORMATION" may also include "ID", "INITIAL POSITION", "UNDOCKING POSITION", and "DOCKING POSITION" as information items. An identifier for identifying each shelving unit may be stored under "ID". Coordinates indicating the initially recognized position of the shelving unit while the autonomous vehicle 120 is traveling in the predetermined space 100 may be stored under "INITIAL POSITION". Alternatively, coordinates indicated a position (for example, the position of the anchor 170) that is predesignated by the user 110 may be stored under "INITIAL POSITION".

Coordinates indicating the position where the autonomous vehicle 120 last undocked with the conveyance-target shelving unit may be stored under "UNDOCKING POSITION". Coordinates indicating the position where the autonomous vehicle 120 last docked with the conveyance-target shelving unit may be stored under "DOCKING POSITION". Note that the coordinates indicating each position may be coordinates on an environment map. Note that, however, the name of a location preassigned on the environment map may be stored instead of the coordinates indicating each position.

The name of an item carried by the conveyance-target shelving unit may be stored under "ITEM". The corresponding item type may be stored under "TAG".

In the case of the conveyance target management table 900 illustrated in FIG. 9, "SHELVING UNIT INFORMATION", "ITEM", and "TAG" are directly associated with one another. However, they may be indirectly associated with one another. "Indirectly associated" may refer to, for example, indirectly associating information A and information B via information C by directly associating the information A with the information C and directly associating the information C with the information B when the information A and the information B are to be associated.

Procedure of Autonomous Driving Process

Figure 10:
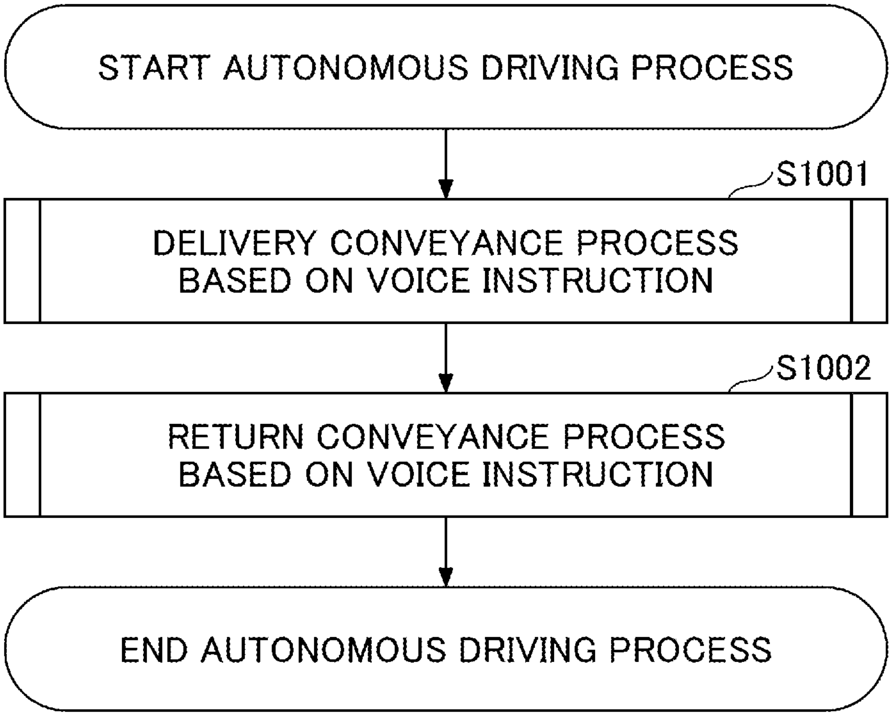
FIG. 10 is a flowchart illustrating an example of the procedure of an autonomous driving process.

The procedure of the autonomous driving process of the autonomous vehicle 120 will be described next. FIG. 10 is a flowchart illustrating an example of the procedure of the autonomous driving process. As illustrated in FIG. 10, the autonomous driving process by the autonomous vehicle 120 can be largely divided into two types of processes.

The first process may be a delivery conveyance process based on voice instruction. The delivery conveyance process based on voice instruction may refer to a process (step S1001) in which the autonomous vehicle 120 identifies both the conveyance-target shelving unit and the conveyance destination position based on the voice instruction from the user 110, docks with the identified shelving unit, and conveys the identified shelving unit to the identified conveyance destination position (the position near the user 110 in this case).

The second process may be a return conveyance process based on voice instruction. The return conveyance process based on voice instruction may refer to a process (step S1002) that is performed after the completion of the first process and in which the autonomous vehicle 120 identifies the conveyance-target shelving unit and the conveyance destination position based on the voice instruction from the user 110, docks with the identified shelving unit, and conveys the identified shelving unit to the identified conveyance destination position (the position of the anchor 170). The first process (step S1001: the delivery conveyance process based on voice instruction) and the second process (step S1002: the return conveyance process based on voice instruction) will be described in detail below.

Details of Delivery Conveyance Process Based on Voice Instruction

Figure 11:
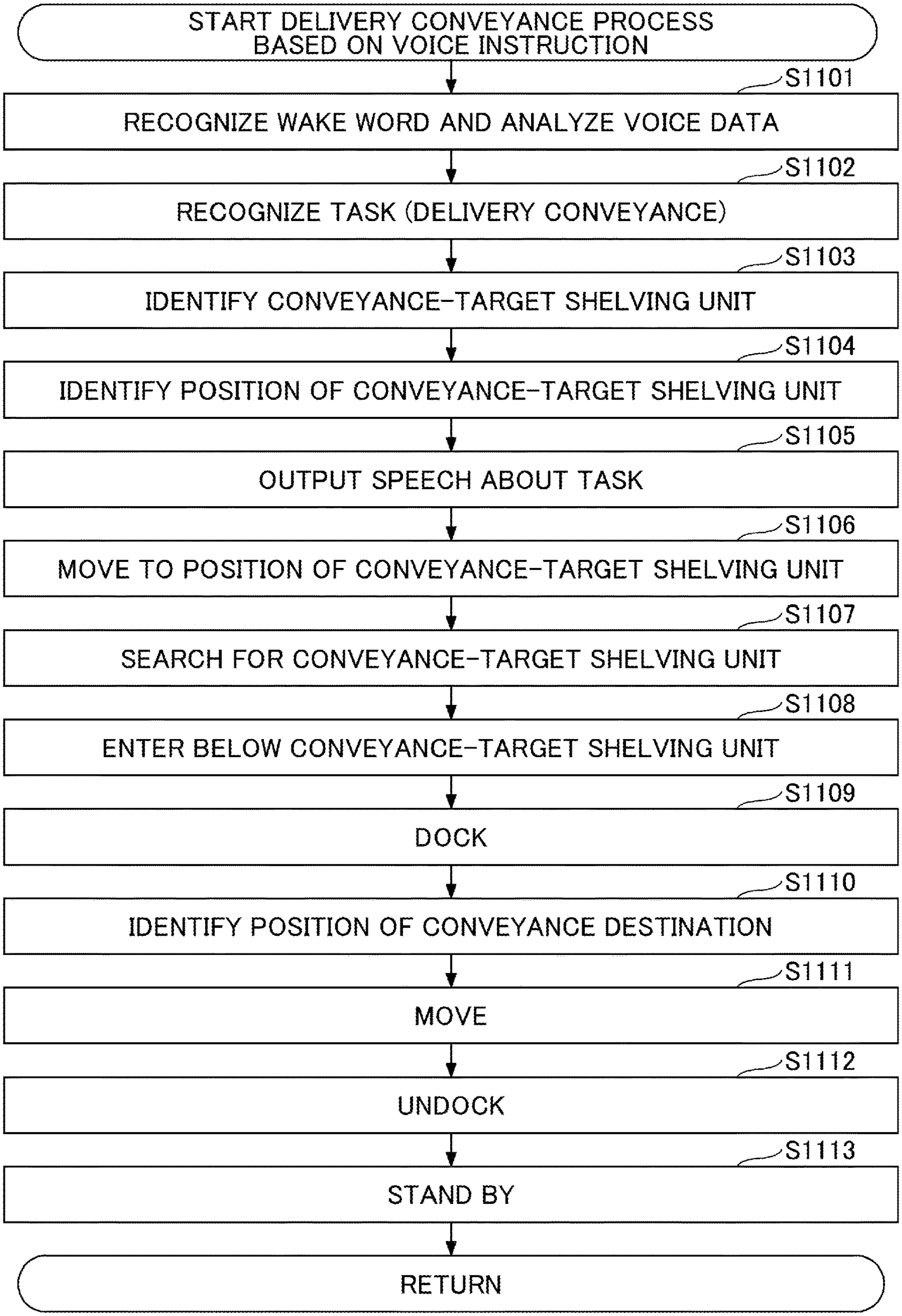
FIG. 11 is a flowchart illustrating an example of the procedure of a delivery conveyance process based on a voice instruction.

The details of the delivery conveyance process (step S1001) based on voice instruction will be described in accordance with FIG. 11 with reference to FIGS. 12A to 12F. FIG. 11 is a flowchart illustrating an example of the procedure of the delivery conveyance process based on voice instruction. FIGS. 12A to 12F are views illustrating examples of the operation of the autonomous vehicle during the delivery conveyance.

In step S1101, the autonomous vehicle 120 recognizes the wake word uttered by the user 110 from the audio data detected by the microphones 301 to 304, and analyzes the audio data detected following the recognized wake word.

Note that the wake word is preset in the autonomous vehicle 120, but the user 110 may also change the wake word to any word.

In step S1102, as a result of analyzing the audio data, the autonomous vehicle 120 may acquire a voice instruction (for example, "Bring me the laptop") in which the user 110 requests for an item. In this case, autonomous vehicle 120 may recognize that the task is to perform delivery conveyance to deliver the laptop computer (an item) to the position near the user 110 (a conveyance destination position).

Further, the autonomous vehicle 120 can analyze the audio data detected by the microphones 301 to 304 to determine the direction in which the voice of the user 110 was emitted (the direction in which the user 110 is present).

Note that the autonomous vehicle 120 may store the determination result about the direction in which the user 110 is present in the memory together with the coordinates indicating the position of the autonomous vehicle 120 and the information indicating the orientation of the autonomous vehicle 120 on a pre-generated environment map (for example, a map of the predetermined space 100).

In step S1103, the autonomous vehicle 120 identifies the conveyance-target shelving unit based on the recognized task. More specifically, the autonomous vehicle 120 refers to the conveyance target management table 900 and identifies, as the conveyance target, the shelving unit associated with the identified item that is to be handled in the recognized task. In this embodiment, since the laptop computer is managed in association with the shelving unit 130, the autonomous vehicle 120 identifies the shelving unit 130 as the conveyance target.

In step S1104, the autonomous vehicle 120 refers to the conveyance target management table 900 to identify the coordinates indicating the position of the conveyance-target shelving unit. For example, in a case where the conveyance-target shelving unit is the shelving unit 130, the coordinates (x1', y1') of the undocking position are identified as the position of the shelving unit 130. As the coordinates (x1', y1') of the undocking position represent the position where the autonomous vehicle 120 last undocked from the shelving unit 130, there is a high probability that the shelving unit 130 is present at this position.

Note that the coordinates under "INITIAL POSITION" in the conveyance target management table 900 may be identified as the coordinates indicating the position of the conveyance-target shelving unit by the autonomous vehicle 120.

In step S1105, the autonomous vehicle 120 emits a speech (audio output) that corresponds to the task recognized in step S1102 to the user 110 via the loudspeakers 305 and 306. For example, in a case where the task is to perform delivery conveyance to deliver the laptop computer (the item) to the position near the user 110 (the conveyance destination position), the autonomous vehicle 120 emits a speech (audio output), "The laptop will be conveyed to the user," to the user 110 via the loudspeakers 305 and 306.

In step S1106, the autonomous vehicle 120 controls the drive wheels 231 to move to the position of the conveyance-target shelving unit. At this time, the autonomous vehicle 120 uses the front RGB camera 221, the ToF camera 222, and the LIDAR device 212 to detect obstacles, and moves while avoiding a collision with each detected obstacle.

Note that as the autonomous vehicle 120 is not docked with the shelving unit 130 at this time, the autonomous vehicle 120 does not recognize an obstacle it does not come into contact with as an obstacle even if the obstacle is an obstacle that can come into contact with the shelving unit 130 while the autonomous vehicle 120 is docked with the shelving unit 130.

Figure 12A:
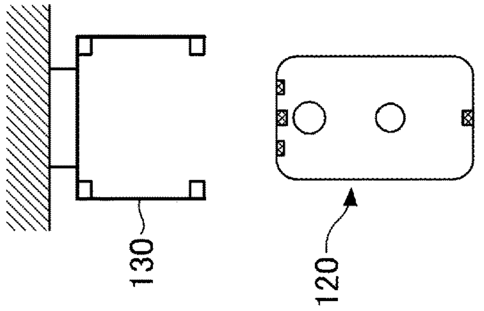
FIGS. 12A to 12F illustrate examples of the operation of the autonomous vehicle during delivery conveyance.

In step S1107, upon arriving at the position near the conveyance-target shelving unit 130, the autonomous vehicle 120 searches for the shelving unit 130 by analyzing the color image acquired from the front RGB camera 221 while continuing to move (see FIG. 12A). Note that pattern matching of the shape of the shelving unit, recognition of the shelving unit using a deep-learning-based object recognition model, or the like may be employed as the method used to search for the shelving unit 130. However, the method used to search for the shelving unit 130 is not limited to these. For example, the shelving unit may be recognized by recognizing a marker applied on the shelving unit. Note that any type of marker may be used. For example, the marker may be a marker encoded with information such as a barcode, a QR code (registered trademark), an AR code, or the like. Alternatively, the marker may be a marker with a distinctive pattern. As a method of recognizing a shelving unit using a marker, for example, information indicating that the shelving unit is conveyable by the autonomous vehicle 120 may be linked to a predetermined marker, and the autonomous vehicle may detect the predetermined marker to identify the conveyance-target shelving unit.

Figure 12B:
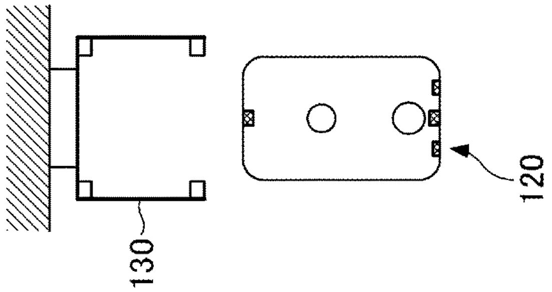
Figure 12C:
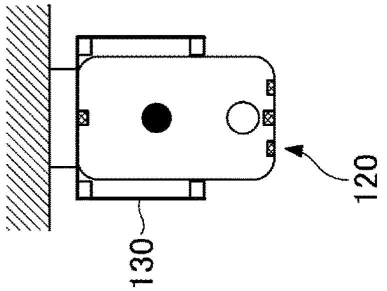

In step S1108, when the conveyance-target shelving unit 130 is found, the autonomous vehicle 120 turns 180 degrees, and enters below the bottom shelf 400 of the shelving unit 130 in the backward direction (see FIG. 12B). Note that even while making an entry in the backward direction, the autonomous vehicle 120 may control the movement of the autonomous vehicle 120 by using the rear RGB camera 320 to recognize the area below the bottom shelf 400 of the shelving unit 130 and adjust the positional relationship with the bottom shelf 400.

In step S1109, the autonomous vehicle 120 determines, based on the signals output from the photoreflectors 330, whether it has moved to a position that allows the lock pin 211 to be inserted into the hole 511 of the lock guide 510.

Further, when the autonomous vehicle 120 has moved to the position that allows the lock pin 211 to be inserted into the hole 511 of the lock guide 510, the autonomous vehicle 120 turns off the solenoid to cause the lock pin 211 to project, thus causing the lock pin 211 to be inserted into the hole 511. As a result, the docking of the autonomous vehicle 120 with the conveyance-target shelving unit 130 is completed (see FIG. 12C).

Upon completion of the docking, the autonomous vehicle 120 updates, with respect to the conveyance-target shelving unit 130, the coordinates that are stored under "DOCKING POSITION" in the conveyance target management table 900 to the coordinates of the actual docking position.

For example, if the autonomous vehicle 120 docked with the conveyance-target shelving unit 130 at the position of coordinates (x1", y1"), the autonomous vehicle 120 updates the coordinates for the "DOCKING POSITION" of the conveyance-target shelving unit 130 in the conveyance target management table to (x1", y1").

In step S1110, the autonomous vehicle 120 identifies the coordinates of the conveyance destination position of the docked shelving unit 130 based on the task recognized in step S1102. For example, in the case where the task is to perform delivery conveyance to deliver the laptop computer (the item) to the position near the user 110 (the conveyance destination position), the autonomous vehicle 120 identifies the coordinates indicating the position near the user 110 as the coordinates indicating the conveyance destination position of the docked shelving unit 130.

Note that when a position near the user 110 is identified as the conveyance destination position, the autonomous vehicle 120 may estimate the position where the user 110 is highly likely to be present based on the information stored in the memory in step S1102. Further, the autonomous vehicle 120 may identify, on the environment map, the coordinates that indicate positions near the estimated position. The information stored in the memory in step S1102 may include the coordinates indicating the position of the autonomous vehicle 120 on the environment map, the information indicating the orientation of the autonomous vehicle 120, and the determination result regarding the direction in which the user 110 is present.

Figure 12D:
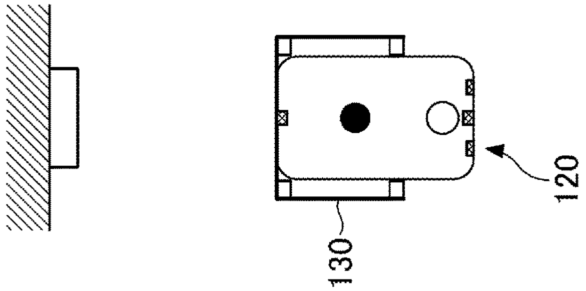
Figure 12E:
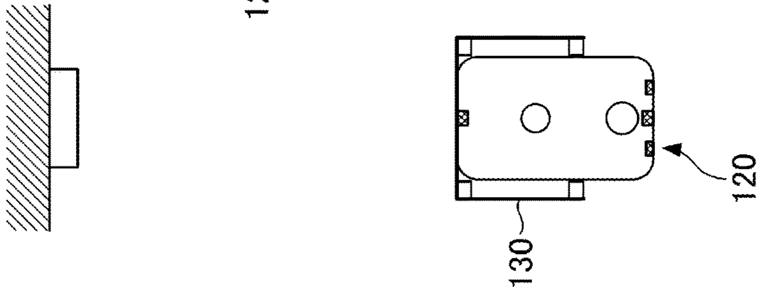
Figure 12F:
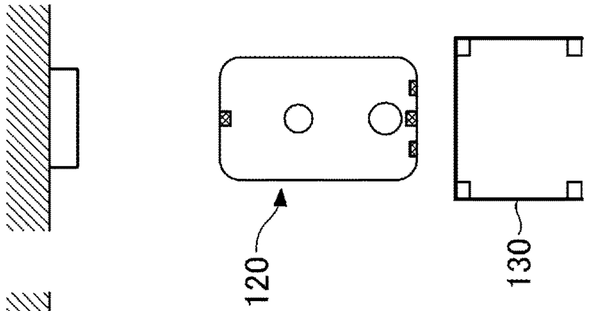

In step S1111, the autonomous vehicle 120 controls the drive wheels 231 to move to the identified conveyance destination position (the position near the user 110) (see FIG. 12D). At this time, the autonomous vehicle 120 uses the front RGB camera 221, the ToF camera 222, and the LIDAR device 212 to detect obstacles, and moves while avoiding a collision with each detected obstacle.

Note that at this time, the autonomous vehicle 120 is already docked with the shelving unit 130. Hence, the autonomous vehicle 120 moves to avoid each obstacle that the shelving unit 130 may come into contact even if the obstacle may not come into contact with the autonomous vehicle 120.

In step S1112, when the autonomous vehicle 120 arrives at the conveyance destination position (for example, the position near the user 110), the autonomous vehicle 120 undocks. Further, the autonomous vehicle 120 updates, with respect to the conveyance-target shelving unit 130, the coordinates indicating the "UNDOCKING POSITION" stored in the conveyance target management table 900 to the coordinates indicating the conveyance destination position (see FIG. 12E).

For example, in a case where the shelving unit 130 is undocked after being conveyed to a position identified by coordinates (x1''', y''') on the environment map, the coordinates indicating the undocking position of the shelving unit 130 in the conveyance target management table 900 are updated to (x1''', y''').

Note that when the autonomous vehicle 120 arrives at the conveyance destination position, the autonomous vehicle 120 analyzes color images acquires from the front RGB camera 221 to search for the user 110. When the user 110 is found, the autonomous vehicle 120 undocks.

In step S1113, the autonomous vehicle 120 uses the front RGB camera 221, the ToF camera 222, and the LIDAR device 212 to confirm the presence of obstacles in the front or the rear. Subsequently, the autonomous vehicle 120 exits from below the bottom shelf 400 of the shelving unit 130 in the direction without an obstacle, which may be either frontward or rearward (see FIG. 12F).

In a case where obstacles are present in both the front and the rear, the autonomous vehicle 120 may stand by for predetermined time to confirm again whether an obstacle is present in the front or the rear. That is, the autonomous vehicle 120 repeatedly alternates between standing by and confirming the presence of an obstacle in the front direction and rear direction.

Note that in a case where an obstacle is confirmed in both the front and rear directions even after the alternation between confirming and standby has been repeated a predetermined number of times, the autonomous vehicle 120 may stand by in that spot. Furthermore, although case where the presence of obstacles in the front direction and the rear direction is confirmed after undocking is described the above description, the autonomous vehicle 120 may be configured to stand by in that spot without confirming the presence of an obstacle after undocking.

Procedure of Return Conveyance Process Based on Voice Instruction

Figure 13:
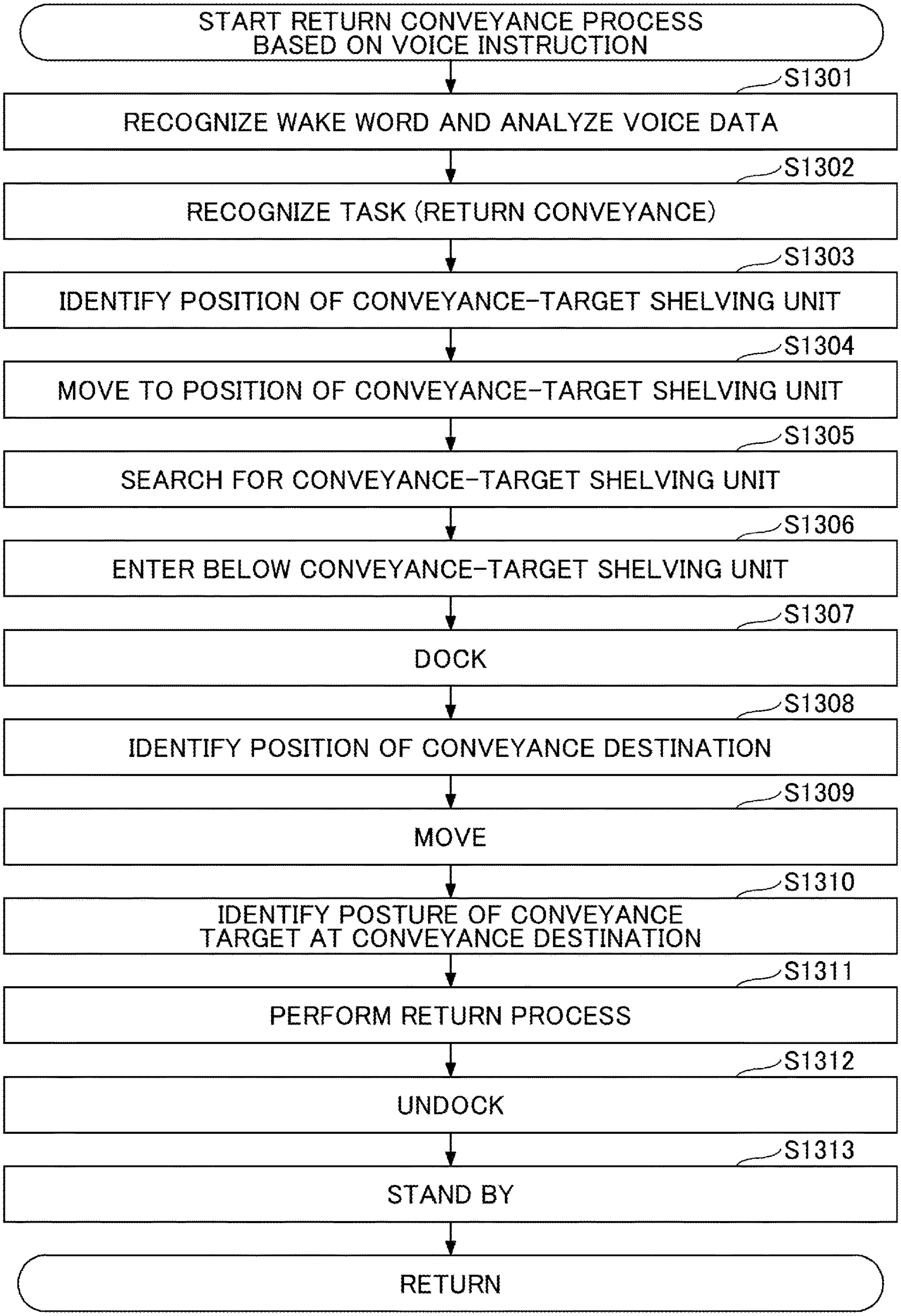
FIG. 13 is a flowchart illustrating an example of the procedure of a return conveyance process based on a voice instruction.

The details of the return conveyance process (step S1002) based on voice instruction will be described in accordance with FIG. 13 with reference to FIGS. 14A to 14F. FIG. 13 is a flowchart illustrating an example of the procedure of the return conveyance process based on voice instruction. FIGS. 14A to 14F are views illustrating examples of the operation of the autonomous vehicle during the return conveyance.

In step S1301, the autonomous vehicle 120 recognizes the wake word uttered by the user 110 from the audio data detected by the microphones 301 to 304, and analyzes the audio data detected following the recognized wake word.

In step S1302, as a result of analyzing the audio data, the autonomous vehicle 120 may acquire a voice instruction (for example, "Return the shelving unit to the original position") to convey the shelving unit 130 to the original position. In this case, autonomous vehicle 120 may recognize that the task is to convey the shelving unit (the conveyance target) to the original position (the conveyance destination position).

In step S1303, the autonomous vehicle 120 refers to the conveyance target management table 900 to identify the coordinates indicating the position of the conveyance-target shelving unit.

In step S1304, the autonomous vehicle 120 controls the drive wheels 231 to move to the position of the conveyance-target shelving unit 130.

Figure 14A:
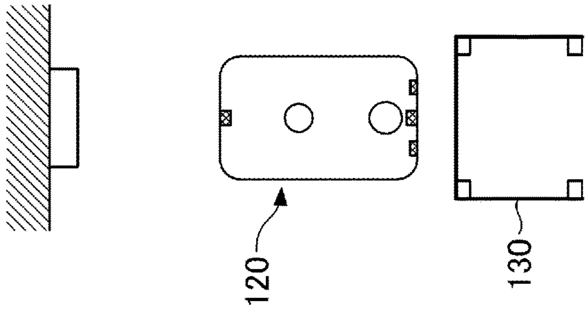
FIGS. 14A to 14F illustrate examples of the operation of the autonomous vehicle during return conveyance.
Figure 14B:
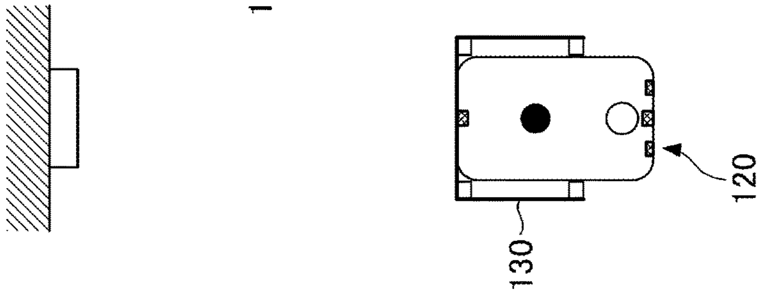
Figure 14C:
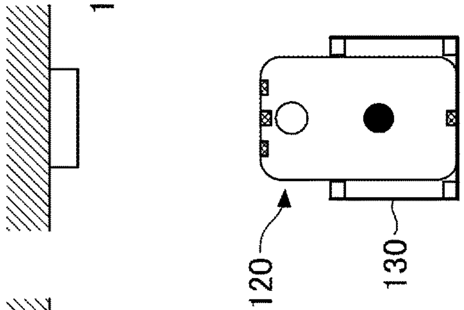

In step S1305, upon arriving at the position near the conveyance-target shelving unit 130, the autonomous vehicle 120 searches for the shelving unit 130 by analyzing the color image acquired from the front RGB camera 221 while continuing to move (see FIG. 14A). Note that pattern matching of the shape of the shelving unit, recognition of the shelving unit using a deep-learning-based object recognition model, or the like may be employed as the method used to search for the shelving unit 130. However, the method used to search for the shelving unit 130 is not limited to these.

In step S1306, when the conveyance-target shelving unit 130 is found, the autonomous vehicle 120 enters below the bottom shelf 400 of the shelving unit 130 in the forward direction.

In step S1307, when the autonomous vehicle 120 has moved to the position that allows the lock pin 211 to be inserted into the hole 511 of the lock guide 510, the autonomous vehicle 120 causes the lock pin 211 to project and be inserted into the hole 511. As a result, the docking of the autonomous vehicle 120 with the conveyance-target shelving unit 130 is completed (see FIG. 14B). Subsequently, the autonomous vehicle 120 moves in the backward direction for a predetermined distance and turns 180 degrees (see FIG. 14C).

In step S1308, the autonomous vehicle 120 identifies, based on the task recognized in step S1302, the coordinates indicating the position of the anchor 170 as the coordinates indicating the conveyance destination position of the docked shelving unit 130.

Figure 14D:
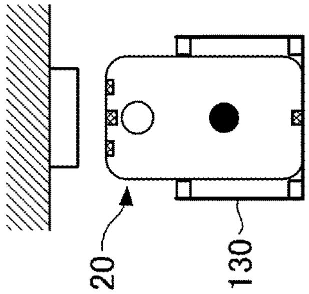

In step S1309, the autonomous vehicle 120 controls the drive wheels 231 to move to the identified conveyance destination position (the position of the anchor 170) (see FIG. 14D).

In step S1310, when the autonomous vehicle 120 arrives near the conveyance destination position (the position of the anchor 170), the autonomous vehicle 120 identifies the posture of the conveyance target at the conveyance destination position (the position of the anchor 170) and turns 180 degrees.

Figure 14E:
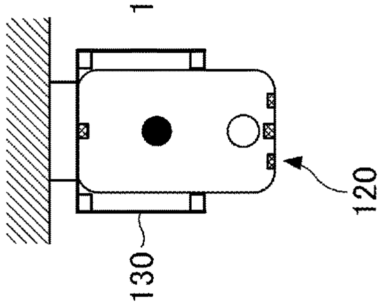

In step S1311, the autonomous vehicle 120 returns the conveyance-target shelving unit 130 to the position of the anchor 170 by moving in the backward direction while analyzing the color image acquired from the rear RGB camera 320 to recognize the position of the anchor 170 (see FIG. 14E).

In step S1312, the autonomous vehicle 120 undocks from the shelving unit 130. Further, the autonomous vehicle 120 updates, with respect to the shelving unit 130, the coordinates indicating the "UNDOCKING POSITION" stored in the conveyance target management table 900 to the coordinates indicating the position of the anchor 170.

Figure 14F:
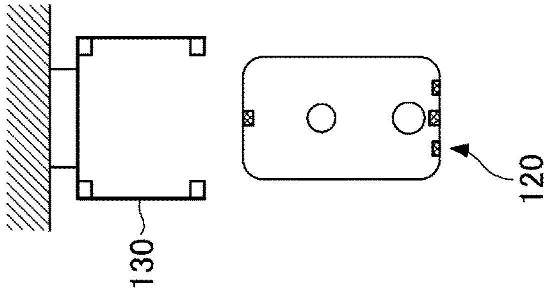

In step S1313, the autonomous vehicle 120 moves in the forward direction to exit from below the bottom shelf 400 of the conveyance-target shelving unit 130 (see FIG. 14F).

SUMMARY

As should be apparent from the above description, the autonomous vehicle 120 according to the first embodiment may include:

- a docking mechanism to dock with a conveyance-target shelving unit;
- a ToF camera as an example of a range sensor that outputs a range image (depth image); and
- a control device to control, based on the range image acquired from the ToF camera, the conveyance performed by the autonomous vehicle docked with the conveyance target, and
- the measurement range of the ToF camera may include at least an area above the autonomous vehicle (that is, an area above the highest part of the autonomous vehicle in a traveling state).

Therefore, according to the first embodiment, an autonomous vehicle with a reduced risk of collision during conveyance can be provided.

Second Embodiment

The above-described first embodiment illustrated an example of a docking mechanism that includes a solenoid lock pin 211 and the photoreflectors 330. However, the docking mechanism is not limited to this, and any conventional mechanism is applicable. Further, the first embodiment described a case where docking is performed after the autonomous vehicle has entered below the bottom shelf of the conveyance-target shelving unit. However, a configuration in which docking is performed without the autonomous vehicle entering below the bottom shelf of the conveyance-target shelving unit may be employed. For example, the autonomous vehicle may perform docking by gripping the legs of the conveyance-target shelving unit with a gripper.

Further, although a shelving unit is exemplified as the conveyance target in the above-described first embodiment, the conveyance target is not limited to a shelving unit. For example, the conveyance target may be any piece of furniture as long as it is piece of furniture with rotatable wheels.

Further, the conveyance target management table is stored in advance in the conveyance target management table storage unit 801 in the above-described first embodiment. However, for example, the conveyance target management table may be successively updated based on the voice instruction from the user 110. Alternatively, the conveyance target management table may be successively updated by the autonomous vehicle 120 through wireless communication with a smart terminal that is carried by the user 110.

Further, in the above-described first embodiment, when the autonomous vehicle 120 is to dock with the shelving unit in the position of the anchor, the autonomous vehicle 120 moves in the backward direction to enter below the bottom shelf of the shelving unit. However, alternatively, the autonomous vehicle 120 may move in the forward direction to enter below the bottom shelf of the shelving unit.

Further, in the above-described first embodiment, when an item is included in the voice instruction from the user 110, the conveyance-target shelving unit is identified by identifying the shelving unit directly associated with the item. However, the identification method of the conveyance-target shelving unit is not limited to this. For example, a configuration in which the conveyance-target shelving unit is identified by identifying the shelving unit that is indirectly associated with the item may be employed.

Further, the above-described first embodiment illustrated, as an example of delivery conveyance, a case where the autonomous vehicle docks with a shelving unit that is standing by in the position of an anchor and conveys the docked shelving unit. However, the autonomous vehicle may dock with a shelving unit that is at the undocking position where undocking was last performed, and subsequently convey the docked shelving unit. The above-described first embodiment also illustrated, as an example of return conveyance, a case where the autonomous vehicle returns the docked shelving unit to the position of the anchor. However, as a position other than the anchor, the autonomous vehicle may return the docked shelving unit to the docking position where docking was last performed.

Further, although a detailed description about the position of the anchor is omitted in the above-described first embodiment, the position of the anchor may be, for example, a position where a two-dimensional identifier such as a QR code (registered trademark) is provided in the predetermined space 100.

Further, the above-described first embodiment illustrated a case where the initial position of the shelving unit is at the position of the anchor. However, the initial position of the shelving unit is not limited to the position of the anchor. For example, the initial position of the shelving unit may be a predetermined position on the environment map.

Further, in the above-described first embodiment, the method for identifying the posture of the shelving unit when the shelving unit is to be returned to the position of the anchor is not described. However, for example, when the shelving unit is to be returned to the position of the anchor, the posture of the shelving unit when the shelving unit docked with the autonomous vehicle 120 in the delivery conveyance may be identified, and the shelving unit may be returned so as to have the same posture as the identified posture. Alternatively, the shelving unit may be returned such that the posture will be a predetermined default posture.

Further, in the above-described first embodiment, when a task is recognized from a user's voice instruction, the next voice instruction is not given until the task is completed. However, the next voice instruction may be input before the task that is being executed is completed.

A case where a voice instruction requesting another task (for example, "Bring me a snack") is recognized before a task (a delivery conveyance task) that is being executed is completed will be described as an example. In this case, the autonomous vehicle 120 may queue the new task after the task that is being executed, and operate according to the new task after the task that is being executed is completed. Note that "the task that is being executed" mentioned here is, for example, the task to convey the shelving unit 130 to the conveyance destination, and "the new task" mentioned here is a task to convey a shelving unit (for example, the shelving unit 140) carrying the snacks to a position near the user 110.

A case where a voice instruction requesting cancellation of the task (for example, "Stop the conveyance") is recognized before the task (the delivery conveyance task) that is being executed is completed will be described as another example. In this case, the autonomous vehicle 120 may stop moving on the spot if the task is cancelled before the docking with the conveyance-target shelving unit (for example, the shelving unit 130) is performed. If the task is canceled after the docking with the conveyance-target shelving unit has been performed, the autonomous vehicle 120 may return the conveyance-target shelving unit to the original position.

A case where a voice instruction requesting another task (for example, "Bring me a snack") is recognized before a task (a return conveyance task) that is being executed is completed will be described as another example. In this case, the autonomous vehicle 120 may immediately operate according to the new task if the task is requested before the docking with the conveyance-target shelving unit (for example, the shelving unit 130) is performed. If the task is requested after the docking with the conveyance-target shelving unit (for example, the shelving unit 130) has been performed, the autonomous vehicle 120 may operate according to the new task by undocking from the conveyance-target shelving unit on the spot without returning the conveyance-target shelving unit to the position of the anchor 170. That is, the autonomous vehicle 120 may operate according to the new task by stopping the conveyance to position of the anchor 170 partway through the conveyance. Alternatively, the autonomous vehicle 120 may queue the new task after the task that is being executed, and operate according to the new task after the task that is being executed is completed. Note that the user may set in advance whether the new task is to be immediately executed by canceling the task that is being executed or whether the new task is to be executed after the completion of the task that is being executed as "a behavior of the autonomous vehicle when a voice instruction requesting a new task is recognized after docking with the conveyance-target shelving unit is performed". Alternatively, the user may make the setting on the spot when the voice instruction for a new task is recognized. Note that "the new task" mentioned here is the task of conveying the shelving unit (for example, the shelving unit 140) carrying the snack to the position near the user 110.

Further, in the above-described first embodiment, when the user 110 gives a voice instruction, the autonomous vehicle 120 immediately executes the task corresponding to the voice instruction. However, in a case where the voice instruction from the user 110 is a voice instruction to reserve the execution of the task at a predetermined time, the autonomous vehicle 120 may execute the task at the predetermined time.

For example, in a case where the user 110 gives a voice instruction by uttering, "Bring the work tools to the desk at 9 AM", the autonomous vehicle 120 may execute the task (the task of conveying the shelving unit 130 carrying the work tools to the position near the desk) at 9 AM instead of executing the task when the voice instruction is acquired.

That is, in a case where the voice instruction of the user 110 includes the execution timing of the task, the autonomous vehicle 120 may detect that the execution timing of the task has arrived and execute the task at the timing identified based on the voice instruction. Note that the setting (also referred to as "reserving") of the execution timing of the task is not limited to a case where a voice instruction is performed. The setting of the execution timing of the task may be performed by an electronic instruction from the external device 730 that can communicate with the autonomous vehicle 120 (the control device 310). The external device 730 may be, for example, a mobile terminal such as a smartphone owned by the user.

Furthermore, in the above-described first embodiment, the autonomous vehicle 120 moved to the position of the conveyance-target shelving unit after emitting a voice output (audio output) corresponding to the recognized task to the user 110 via the loudspeakers 305 and 306 (see steps S1105 and S1106).

However, the emission timing of the voice output (audio output) corresponding to the recognized task is not limited to this. For example, the autonomous vehicle 120 may emit the voice output corresponding to the recognized task to the user 110 via the loudspeakers 305 and 306 after the autonomous vehicle 120 has started to move to the position of the conveyance-target shelving unit. That is, the autonomous vehicle 120 may emit the voice output corresponding to the task from the loudspeakers before the conveyance of the docked conveyance-target shelving unit is completed. The timing before the completion of the conveyance of the conveyance target to the conveyance destination may be any timing before completion of conveyance, such as at the start of the movement toward the conveyance target, during the movement, at the docking with the conveyance target, at the conveyance of the conveyance target after the docking with the conveyance target is performed, during the conveyance, or the like.

Note that the above embodiments described a case where the docking of the autonomous vehicle 120 with the conveyance target and the conveyance of the conveyance target by the autonomous vehicle 120 are controlled based on user's utterance acquired through a microphone serving as an audio input device. However, the docking with the conveyance target and the conveyance of the conveyance target may be controlled based on a specific sound acquired through the microphone serving as an audio input device. Examples of the specific sound may include a series of sounds generated by clapping hands N times at approximately M second intervals, whistling, and the like. In this case, at least one of the conveyance target or the conveyance destination position may be preset in advance for each specific sound. That is, a voice instruction may include not only a user's voice-based instruction but also an instruction given by a specific sound.

Third Embodiment

In the above-described embodiments, the ToF camera 222 may be constantly set in an enabled state while the autonomous vehicle 120 is in operation. However, the operation method of the ToF camera 222 is not limited to this.

For example, the ToF camera 222 may be set in the enabled state when the autonomous vehicle 120 is docked with a shelving unit, and the ToF camera 222 may be set in a disabled state when the autonomous vehicle 120 is not docked with a shelving unit.

Enabling and disabling the ToF camera 222 in accordance with whether the autonomous vehicle 120 is docked with a shelving unit in this manner may allow the power consumption of the autonomous vehicle 120 during operation to be reduced.

Further, if the ToF camera 222 is constantly set in the enabled state, the autonomous vehicle 120 may travel to avoid collision with obstacles in areas where the shelving unit would pass if docked, regardless of whether the autonomous vehicle 120 is docked with the shelving unit or not. Hence, the autonomous vehicle 120 may travel to avoid collision with an obstacle (that is, make a detour) even in case where the obstacle would not be an obstruction when the autonomous vehicle 120 is traveling without being docked with the shelving unit.

Enabling and disabling the ToF camera 222 in accordance with whether the autonomous vehicle 120 is docked with a shelving unit may allow the autonomous vehicle 120 to avoid making a detour while traveling without being docked with the shelving unit.

In the above description, the ToF camera 222 is switched between an enabled state and the disabled state to avoid causing the autonomous vehicle 120 to make a detour while traveling when the autonomous vehicle 120 is not docked with a shelving unit. However, instead of enabling and disabling the ToF camera 222, the control method may be switched based on the detection result from the ToF camera 222. More specifically, even in a case where an obstacle is detected based on a range image captured by the ToF camera 222, control may be performed such that the detection result is ignored when the autonomous vehicle 120 is not docked with a shelving unit. As a result, in a similar manner to the case where the ToF camera 222 is switched between the enabled state and the disabled state depending on whether the autonomous vehicle 120 is docked with a shelving unit, the autonomous vehicle 120 is able to travel without making a detour when the autonomous vehicle 120 is not docked with a shelving unit.

Further, in the above description, the ToF camera 222 captured obstacles and the like by setting an area to be passed by the docked shelving unit (that is, an area corresponding to the height of the docked shelving unit×the width of the docked shelving unit) as the measurement range. However, the type of the shelving unit that is to be docked with the autonomous vehicle 120 may not be always the same, and the size of the shelving unit can change if the type of the shelving unit changes.

Therefore, when docking with a shelving unit, the autonomous vehicle 120 may recognize, for example, the marker applied on the shelving unit to determine at least one of the type, the height, or the width of the shelving unit, and subsequently change the measurement range of the ToF camera 222 in accordance with the determination result. Alternatively, the autonomous vehicle 120 may change the obstacle detection range in accordance with the determination result.

Such a configuration may allow the autonomous vehicle 120 to determine a conveyance path suitable to the size of the shelving unit when the shelving unit is to be conveyed.

Other Embodiments

In the present specification (including the claims), if the expression “at least one of a, b, and c” or “at least one of a, b, or c” is used (including similar expressions), any one of a, b, c, a-b, a-c, b-c, or a-b-c is included. Multiple instances may also be included in any of the elements, such as a-a, a-b-b-b, and a-a-b-b-c-c. Further, the addition of another element other than the listed elements (i.e., a, b, and c), such as adding d as a-b-c-d, is included.

In the present specification (including the claims), in a case where an expression such as “data as an input”, “based on data”, “according to data”, or “in accordance with data” (including similar expressions) is used, such a case may, unless otherwise noted, encompass a case in which various data themselves are used as an input and a case in which data obtained by processing various data (e.g., data obtained by adding noise, normalized data, and intermediate representation of various data) are used as an input. If it is described that any result can be obtained “based on data”, “according to data”, or “in accordance with data”, a case in which the result is obtained based on only the data are included, and a case in which the result is obtained affected by another data other than the data, factors, conditions, and/or states may be included. If it is described that “data are output”, unless otherwise noted, a case in which various data themselves are used as an output is included, and a case in which data obtained by processing various data in some way (e.g., data obtained by adding noise, normalized data, and intermediate representation of various data) are used as an output is included.

In the present specification (including the claims), if the terms “connected” and “coupled” are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression “A configured to B” is used, a case in which a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (i.e., an instruction). If the element A is a dedicated processor or a dedicated arithmetic circuit, a circuit structure of the processor may be implemented so as to actually perform the operation B irrespective of whether the control instruction and the data are actually attached.

In the present specification (including the claims), if a term indicating containing or possessing (e.g., “comprising/including” and “having”) is used, the term is intended as an open-ended term, including an inclusion or possession of an object other than a target object indicated by the object of the term. If the object of the term indicating an inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, states, and/or the like are satisfied, and is not necessarily obtained in the claimed invention that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data.

Although the embodiments of the present disclosure have been described in detail above, the present disclosure is not limited to the individual embodiments described above. Various additions, modifications, substitutions, partial deletions, and the like may be made without departing from the conceptual idea and spirit of the invention derived from the contents defined in the claims and the equivalents thereof. For example, in all of the embodiments described above, numerical values used for description are presented as an example and are not limited to them. Additionally, the orders of operations in the embodiments are illustrated as an example and are not limited thereto.

What is claimed is:

1. An autonomous vehicle configured to dock with a conveyance target and to convey the conveyance target, the autonomous vehicle comprising:

a docking mechanism configured to dock with the conveyance target;

a sensor, having a vertical angle of view that is an acute angle and a horizontal angle of view, configured to acquire object position data related to a position of an object within a measurement range that is based at least in part on the vertical angle of view and the horizontal angle of view, the sensor installed to be inclined at a predetermined angle relative to a travel surface, on which the autonomous vehicle travels, such that a center of the vertical angle of view of the sensor faces forward and obliquely upward relative to the travel surface of the autonomous vehicle; and a controller configured to control, based on the object position data acquired from the sensor, the conveyance performed by the autonomous vehicle docked with the conveyance target, wherein the measurement range of the sensor includes at least an area above the autonomous vehicle, a front part of the autonomous vehicle has a front surface and a recess having an opening formed in the front surface, and the sensor is installed inside the recess, at a location set back from the opening of the recess toward an interior of the recess, to be inclined at the predetermined angle relative to the travel surface such that the center of the vertical angle of view of the sensor faces forward and obliquely upward relative to the travel surface.

2. The autonomous vehicle as claimed in claim 1, wherein the controller is configured to detect, from the object position data, an obstacle within the measurement range that includes the area above the autonomous vehicle, and to control the autonomous vehicle that is docked with the conveyance target to perform conveyance so as to avoid the detected obstacle.

3. The autonomous vehicle as claimed in claim 2, wherein in a case where the autonomous vehicle is docked with the conveyance target, the controller is configured to detect, from the object position data, the obstacle within the measurement range that includes the area above the autonomous vehicle.

4. The autonomous vehicle as claimed in claim 3, wherein the controller is configured to detect the obstacle within the measurement range that includes the area above the autonomous vehicle, and the measurement range has dimensions that correspond to a size of the docked conveyance target.

5. The autonomous vehicle as claimed in claim 1, wherein the sensor is installed in the autonomous vehicle such that a portion of the conveyance target is not included in the measurement range in a state where the autonomous vehicle is docked with the conveyance target.

6. The autonomous vehicle as claimed in claim 1, wherein the docking mechanism is configured to dock with the conveyance target in a state where the autonomous vehicle has entered below a bottom of the conveyance target, and wherein the sensor is installed in a lower position relative to a height of the bottom of the conveyance target.

7. The autonomous vehicle as claimed in claim 1, wherein the center of the vertical angle of view of the sensor is configured to face obliquely upward relative to the travel surface, such that the vertical angle of view of the sensor excludes the travel surface of the autonomous vehicle.

8. The autonomous vehicle as claimed in claim 1, wherein the sensor includes a time-of-flight (ToF) range sensor, the ToF range sensor being installed to face obliquely upward to an extent that the travel surface on which the autonomous vehicle travels is not included in the measurement range.

9. The autonomous vehicle as claimed in claim 1, wherein the front part of the autonomous vehicle is provided with a first RGB camera configured to capture the travel surface in a forward direction of the autonomous vehicle, and wherein the controller is configured to control, based on an image captured by the first RGB camera, forward directional travel of the autonomous vehicle as the autonomous vehicle performs the conveyance.

10. The autonomous vehicle as claimed in claim 9, wherein the sensor is installed in a lower position relative to the first RGB camera provided in the front part of the autonomous vehicle.

11. The autonomous vehicle as claimed in claim 9, wherein the controller is configured to control, based on the image captured by the first RGB camera, entry of the autonomous vehicle below a bottom of the conveyance target.

12. The autonomous vehicle as claimed in claim 9, wherein a rear part of the autonomous vehicle is provided with a second RGB camera configured to capture an image in a backward direction of the autonomous vehicle, and wherein the controller is configured to control, based on the image captured by the second RGB camera, backward directional travel of the autonomous vehicle as the autonomous vehicle performs the conveyance.

13. The autonomous vehicle as claimed in claim 12, wherein the second RGB camera is installed in a position that is covered by the conveyance target in a state where the autonomous vehicle is docked with the conveyance target, and wherein in a case where the autonomous vehicle is to convey the conveyance target docked by the docking mechanism to a conveyance destination position, the controller is configured to control, based on the image captured by the second RGB camera, the backward directional travel performed by the autonomous vehicle.

14. The autonomous vehicle as claimed in claim 12, wherein the controller is configured to control, based on the image captured by the second RGB camera, entry of the autonomous vehicle below a bottom of the conveyance target.

15. The autonomous vehicle as claimed in claim 13, wherein in a case where the autonomous vehicle is to convey the conveyance target docked by the docking mechanism to the conveyance destination position, the controller is configured to perform a process of controlling, based on the image captured by the first RGB camera, the forward directional travel performed by the autonomous vehicle, and a process of controlling, based on the image captured by the second RGB camera, the backward directional travel performed by the autonomous vehicle.

16. The autonomous vehicle as claimed in claim 12, wherein the controller is configured to cause the docking mechanism to undock from the conveyance target after controlling the conveyance performed by the autonomous vehicle docked with the conveyance target, and to cause the autonomous vehicle to move in the forward direction or the backward direction based on the image captured by the first RGB camera or the second RGB camera.

17. The autonomous vehicle as claimed in claim 1, further comprising drive wheels provided in a width direction of the autonomous vehicle, each drive wheel being coaxially provided with respect to a rotational axis of the other drive wheel and configured to be driven independently of the other drive wheel, and wherein the docking mechanism includes a conveyance-target docking part at a center position of the drive wheels provided in the width direction so as to be on the rotational axis of each drive wheel provided in the width direction.

18. The autonomous vehicle as claimed in claim 17, wherein a plurality of wheels are rotatably attached to the conveyance target, and wherein a center position with respect to respective centers of rotation of the plurality of wheels matches the center position of the drive wheels provided in the width direction.

19. The autonomous vehicle as claimed in claim 1, further comprising a microphone installed in a corner on a front side of the autonomous vehicle, wherein the microphone is installed in a position that is not covered by the conveyance target while the autonomous vehicle is docked with the conveyance target.

20. The autonomous vehicle as claimed in claim 1, further comprising a sensor configured to measure around the autonomous vehicle, wherein the controller is configured to control, based on a measurement result measured by the sensor, the conveyance performed by the autonomous vehicle, wherein the conveyance target includes a guide configured to guide a lateral surface of the autonomous vehicle, and wherein the guide includes a guide opening to allow the sensor to measure in a lateral direction of the autonomous vehicle while the autonomous vehicle is docked with the conveyance target.

21. The autonomous vehicle as claimed in claim 1, wherein the center of the vertical angle of view of the sensor is configured to face obliquely upward relative to the travel surface, such that the vertical angle of view of the sensor excludes the travel surface of the autonomous vehicle and an upward vertical direction of the sensor and is limited to a forward and upward region of the autonomous vehicle.

22. An autonomous vehicle configured to dock with a conveyance target and to convey the conveyance target, the autonomous vehicle comprising:

a docking mechanism configured to dock with the conveyance target;

a sensor, having a vertical angle of view that is an acute angle and a horizontal angle of view, configured to acquire object position data related to a position of an object within a measurement range based on the vertical angle of view and the horizontal angle of view, the sensor installed to be inclined at a predetermined angle relative to a travel surface, on which the autonomous vehicle travels, such that a center of the vertical angle of view of the sensor faces forward and obliquely upward relative to the travel surface of the autonomous vehicle, and a controller configured to control, based on the object position data acquired from the sensor, the conveyance performed by the autonomous vehicle docked with the conveyance target, wherein the measurement range of the sensor includes at least an area above the autonomous vehicle, the controller is configured to set the measurement range having a different width in a vertical direction according to the conveyance target to be docked, in acquiring the object position data, a front part of the autonomous vehicle has a front surface and a recess having an opening formed in the front surface, and the sensor is installed inside the recess, at a location set back from the opening of the recess toward an interior of the recess, to be inclined at the predetermined angle relative to the travel surface such that the center of the vertical angle of view of the sensor faces forward and obliquely upward relative to the travel surface.

23. The autonomous vehicle as claimed in claim 22, wherein the controller is configured to, in response to detecting a first object in a state in which the autonomous vehicle is not docked with the conveyance target, the first object being an obstruction to the autonomous vehicle in a case in which the autonomous vehicle is docked with the conveyance target, ignore a result of detecting the first object and control the autonomous vehicle to travel on the traveling surface.

24. An autonomous vehicle configured to dock with a conveyance target and to convey the conveyance target, the autonomous vehicle comprising:

drive wheels provided in a width direction of the autonomous vehicle, each drive wheel being coaxially provided with respect to a rotational axis of the other drive wheel and configured to be driven independently of the other drive wheel;

a docking mechanism configured to dock with the conveyance target, the docking mechanism including a conveyance-target docking part at a center position of the drive wheels provided in the width direction so as to be on the rotational axis of each drive wheel provided in the width direction;

a sensor, having a vertical angle of view that is an acute angle and a horizontal angle of view, configured to acquire object position data related to a position of an object within a measurement range defined based on the vertical angle of view and the horizontal angle of view, the sensor installed to be inclined at a predetermined angle relative to a travel surface, on which the autonomous vehicle travels, such that a center of the vertical angle of view of the sensor faces forward and obliquely upward relative to the travel surface of the autonomous vehicle; and a controller configured to control, based on the object position data acquired from the sensor, the conveyance performed by the autonomous vehicle docked with the conveyance target, wherein the measurement range of the sensor includes at least an area above the autonomous vehicle, a front part of the autonomous vehicle has a front surface and a recess having an opening formed in the front surface, and the sensor is installed inside the recess, at a location set back from the opening of the recess toward an interior of the recess, to be inclined at the predetermined angle relative to the travel surface such that the center of the vertical angle of view of the sensor faces forward and obliquely upward relative to the travel surface.

25. The autonomous vehicle as claimed in claim 1, wherein the horizontal angle of view of the sensor is less than 180 degrees.

26. The autonomous vehicle as claimed in claim 1, wherein the area above the autonomous vehicle included in the measurement range of the sensor is an area obliquely above and in front of the autonomous vehicle.

27. The autonomous vehicle as claimed in claim 1, wherein the docking mechanism docks with the conveyance target in a state in which the autonomous vehicle enters a space between legs of the conveyance target, and wherein the sensor is installed in the autonomous vehicle to be located between the legs of the conveyance target in a state in which the autonomous vehicle docks with the conveyance target as viewed from the front part of the autonomous vehicle.

28. The autonomous vehicle as claimed in claim 27, wherein the sensor is installed in the autonomous vehicle to be projected from the front part of the autonomous vehicle in the state in which the autonomous vehicle docks with the conveyance target.

29. The autonomous vehicle as claimed in claim 28, wherein the sensor is installed in the autonomous vehicle to be located at a position lower than a height of the space between the legs of the conveyance target in the state in which the autonomous vehicle docks with the conveyance target.

* * * * *